United States Patent
Tajima et al.

(10) Patent No.: US 9,978,416 B2
(45) Date of Patent: May 22, 2018

(54) REPRODUCING DEVICE

(71) Applicants: Sharp Kabushiki Kaisha, Sakai, Osaka (JP); Memory-Tech Holdings Inc., Minato-ku, Tokyo (JP)

(72) Inventors: Hideharu Tajima, Sakai (JP); Masaki Yamamoto, Sakai (JP); Hirohisa Yamada, Sakai (JP); Takayuki Naka, Sakai (JP); Masahito Konishi, Chikusei (JP)

(73) Assignees: SHARP KABUSHIKI KAISHA, Sakai (JP); MEMORY-TECH HOLDINGS INC., Tokyo (JP)

( * ) Notice: Subject to any disclaimer, the term of this patent is extended or adjusted under 35 U.S.C. 154(b) by 0 days. days.

(21) Appl. No.: 15/715,232

(22) Filed: Sep. 26, 2017

(65) Prior Publication Data
US 2018/0018998 A1    Jan. 18, 2018

Related U.S. Application Data

(63) Continuation of application No. 15/455,167, filed on Mar. 10, 2017, now Pat. No. 9,805,761, which is a continuation of application No. 14/902,941, filed as application No. PCT/JP2014/060193 on Apr. 8, 2014, now Pat. No. 9,633,688.

(30) Foreign Application Priority Data
Jul. 16, 2013  (JP) ................. 2013-147776

(51) Int. Cl.
*G11B 7/00* (2006.01)
*G11B 20/10* (2006.01)
*G11B 7/1374* (2012.01)
*G11B 7/13* (2012.01)
*G11B 7/005* (2006.01)

(52) U.S. Cl.
CPC ...... *G11B 20/10314* (2013.01); *G11B 7/0052* (2013.01); *G11B 7/13* (2013.01); *G11B 7/1374* (2013.01)

(58) Field of Classification Search
CPC ... G11B 7/24085; G11B 7/24; G11B 2220/20; G11B 7/13927; G11B 7/0053; G11B 7/0133; G11B 2007/006; G11B 7/0903; G11B 7/1305; G11B 7/0956; G11B 7/094; G11B 20/10314; G11B 7/0052; G11B 7/013; G11B 2007/0006; G11B 7/1353
USPC ........ 369/112.01, 112.03, 109.1, 103, 44.32, 369/44.23, 112.05
See application file for complete search history.

(56) References Cited

PUBLICATIONS

Tajima et al., "Reproducing Device", U.S. Appl. No. 15/455,167, filed Mar. 10, 2017.

*Primary Examiner* — Nabil Hindi
(74) *Attorney, Agent, or Firm* — Keating & Bennett, LLP

(57) ABSTRACT

A reproducing device (100) includes (i) an optical pickup (6) for irradiating, with reproduction light, an optical disk (1) which is a super-resolution medium, (ii) an RF signal processing circuit (9) for converting, into a reproduction signal, light which reflected off optical disk (1), (iii) an i-MLSE detecting section (141) for evaluating quality of the reproduction signal, and (iv) a spherical aberration correcting section (142) for correcting a spherical aberration by using a result of evaluation of the quality of the reproduction signal.

2 Claims, 16 Drawing Sheets

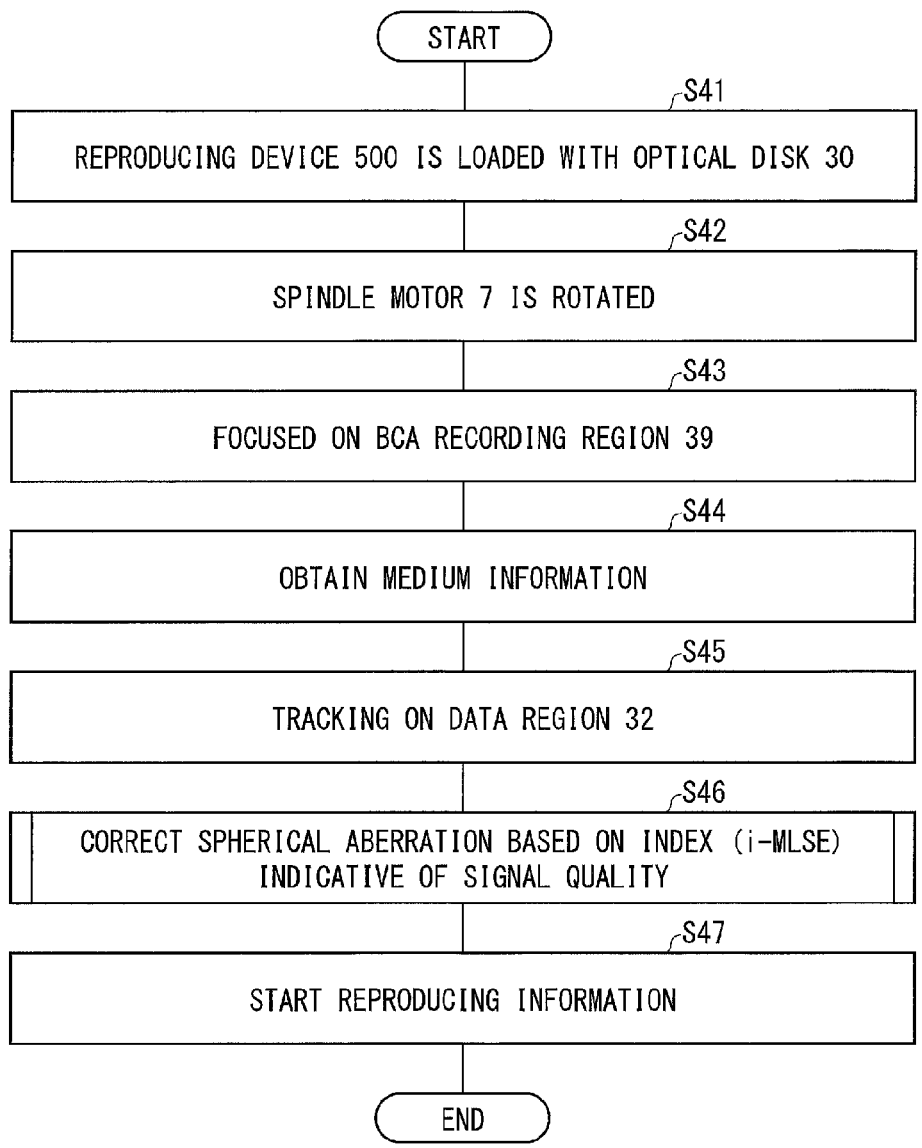

REPRODUCING DEVICE

TECHNICAL FIELD

The present invention relates to a reproducing device capable of reproducing information.

BACKGROUND ARTS

An optical disk serving as an optical recording medium includes a transmissive substrate having a given thickness so that the transmissive substrate covers a recording surface of the optical disk in order to protect the recording surface. An optical pickup serving as an information reading section reads out recorded information from the optical disk based on an amount of light which is reflected off the recording surface when the recording surface is irradiated with reading beam light via the transmissive substrate.

Note, however, that in a case of producing optical disks, it is difficult to form transmissive substrates of all of the optical disks so that the transmissive substrates have thicknesses within a specified value, and this typically causes a thickness error of several μm. Such a thickness error of the transmissive substrate causes a spherical aberration. The occurrence of the spherical aberration causes a problem that an amplitude level of an information reading signal and/or a tracking error signal may be considerably decreases, and this therefore reduces accuracy of information reading. That is, in a case where an optical disk is replaced with another optical disk, a thickness of a transmissive substrate changes, and this changes a spherical aberration. Accuracy of information reading is therefore reduced in a case where no process is carried out with respect to the spherical aberration thus changed.

As such, in order to improve accuracy of information reproduction, it is necessary to correct the spherical aberration. For example, Patent Literature 1 discloses a technique of correcting such a spherical aberration. According to the technique disclosed in Patent Literature 1, the spherical aberration is corrected so that an amplitude of an RF (Radio Frequency) signal becomes maximum.

CITATION LIST

Patent Literature

Patent Literature 1
Japanese Patent Application Publication Tokukai No. 2004-145987 (Publication date: May 20, 2004)

SUMMARY OF INVENTION

Technical Problem

In recent years, an optical information recording medium is demanded to have increased information storage capacity for processing an enormous amount of information, such as images. Examples of methods of meeting the demand encompass a method using a super-resolution technique, which is one of techniques of improving information processing to be carried out during reproduction of the optical information recording medium.

The super-resolution technique is a technique of reproducing a signal having a mark length shorter than an optical system resolution limit (a limit determined based on (i) a laser wavelength and (ii) a numerical aperture of an optical system) of a reproducing device. The super-resolution technique makes it possible to carry out recording by using a shorter mark length, and this substantially increases a recording density. This is because it is not a recording technique but a reproduction technique that matters when the recording density is increased. Note that the optical system resolution limit is $\lambda/4NA$, where (i) $\lambda$ indicates a wavelength of reproduction light irradiated from the reproducing device and (ii) NA indicates a numerical aperture of an objective lens.

Note, however, that in a case where (i) a spherical aberration is corrected, as disclosed in Patent Literature 1, so that an amplitude of an RF signal becomes maximum and (ii) information recorded on an optical information recording medium (super-resolution medium) reproducible by the super-resolution technique is reproduced, a sufficient signal characteristic may not be obtained depending on shapes of pits which are provided on the super-resolution medium. That is, in a case where (i) the spherical aberration is corrected by using a spherical aberration correcting value obtained when a maximum amount of light (reflected light amount, return light amount) is reflected off the super-resolution medium irradiated with reproduction light and (ii) the information recorded on the super-resolution medium is reproduced, reliability of the information reproduction may deteriorate depending on the shapes of the pits which are provided on the super-resolution medium. The inventors of the present application found that, as described above, a sufficient signal characteristic may not be obtained depending on the shapes of the pits which are provided on the super-resolution medium.

The present invention has been made in view of the problems, and an object of the present invention is to provide a reproducing device capable of accurately reproducing information recorded on unspecified number of super-resolution media.

Solution to Problem

In order to attain the problem, a reproducing device in accordance with an aspect of the present invention is a reproducing device capable of reproducing content from an optical information recording medium in which the content is recorded in a form of a pit group including one or more pits shorter than an optical system resolution limit of the reproducing device, including: an irradiation section for irradiating the optical information recording medium with reproduction light; a conversion section for converting, into reproduction signal indicative of the content, light which reflected off the optical information recording medium; a signal quality evaluating section for evaluating quality of the reproduction signal converted by the conversion section; and a spherical aberration correcting section for correcting a spherical aberration caused by the irradiation section, by using a result of evaluation of the quality of the reproduction signal which quality has been evaluated by the signal quality evaluating section.

In order to attain the problem, a reproducing device in accordance with an aspect of the present invention is a reproducing device capable of reproducing content by irradiating, via an objective lens having a numerical aperture of 0.85, an optical information recording medium with reproduction light having a wavelength of 405 nm, the optical information recording medium including (a) a light transmitting layer having a surface which the reproduction light enters, (b) an information recording layer which the reproduction light reflects off so that information is reproduced, and (c) a substrate on which a pit group is provided in a scanning direction, the pit group including one or more pits shorter than 119 nm which is an optical system resolution limit of the reproducing device, the light transmitting layer, the information recording layer, and the substrate being provided in this order from a side from which the reproduction light enters, the content being recorded in the information recording layer by use of the pit group, including: an irradiation section for irradiating the optical information recording medium with reproduction light; a conversion section for converting, into reproduction signal indicative of the content, light which reflected off the optical information recording medium; a signal quality evaluating section for evaluating quality of the reproduction signal converted by the conversion section; and a spherical aberration correcting section for correcting a spherical aberration caused by the irradiation section, by using a result of evaluation of the quality of the reproduction signal which quality has been evaluated by the signal quality evaluating section.

In order to attain the problem, a reproducing device in accordance with an aspect of the present invention is a reproducing device capable of reproducing content from an optical information recording medium having (i) a first region in which the content is recorded in a form of a first pit group including one or more pits shorter than an optical system resolution limit of the reproducing device and (ii) a second region in which medium identification information for distinguishing a type of the optical information recording medium is recorded in a form of a second pit group including pits each having a length not less than the optical system resolution limit of the reproducing device, the reproducing device including: a first spherical aberration correcting section for, during reproduction of the content recorded in the first region, carrying out a process of correcting, by using a result of evaluation of quality of a reproduction signal indicative of the content, a spherical aberration caused by an irradiation section for irradiating the optical information recording medium with reproduction light; and a second spherical aberration correcting section for, during reproduction of the medium identification information recorded in the second region, correcting, by carrying out a process different from the process to be carried out by the first spherical aberration correcting section, the spherical aberration caused by the irradiation section.

Advantageous Effects of Invention

An aspect of the present invention brings about an effect of accurately reproducing information recorded on unspecified number of super-resolution media.

BRIEF DESCRIPTION OF DRAWINGS

FIG. 16 is a flow chart showing an example flow of how a reproduction operation is carried out, with respect to the optical disk, in the reproducing device in accordance with Embodiment 5 of the present invention.

DESCRIPTION OF EMBODIMENTS

Embodiment 1

The following description discusses an embodiment of the present invention with reference to FIGS. 1 through 6. Note that "content," described in Embodiment 1 and Embodiments 2 through 5 (later described), refers to information which is to be used by a user. Specific examples of the content encompass (i) a static image such as a photograph, (ii) a moving image such as a movie, and (iii) a program.

<Configuration of Reproducing Device>

Figure 1:
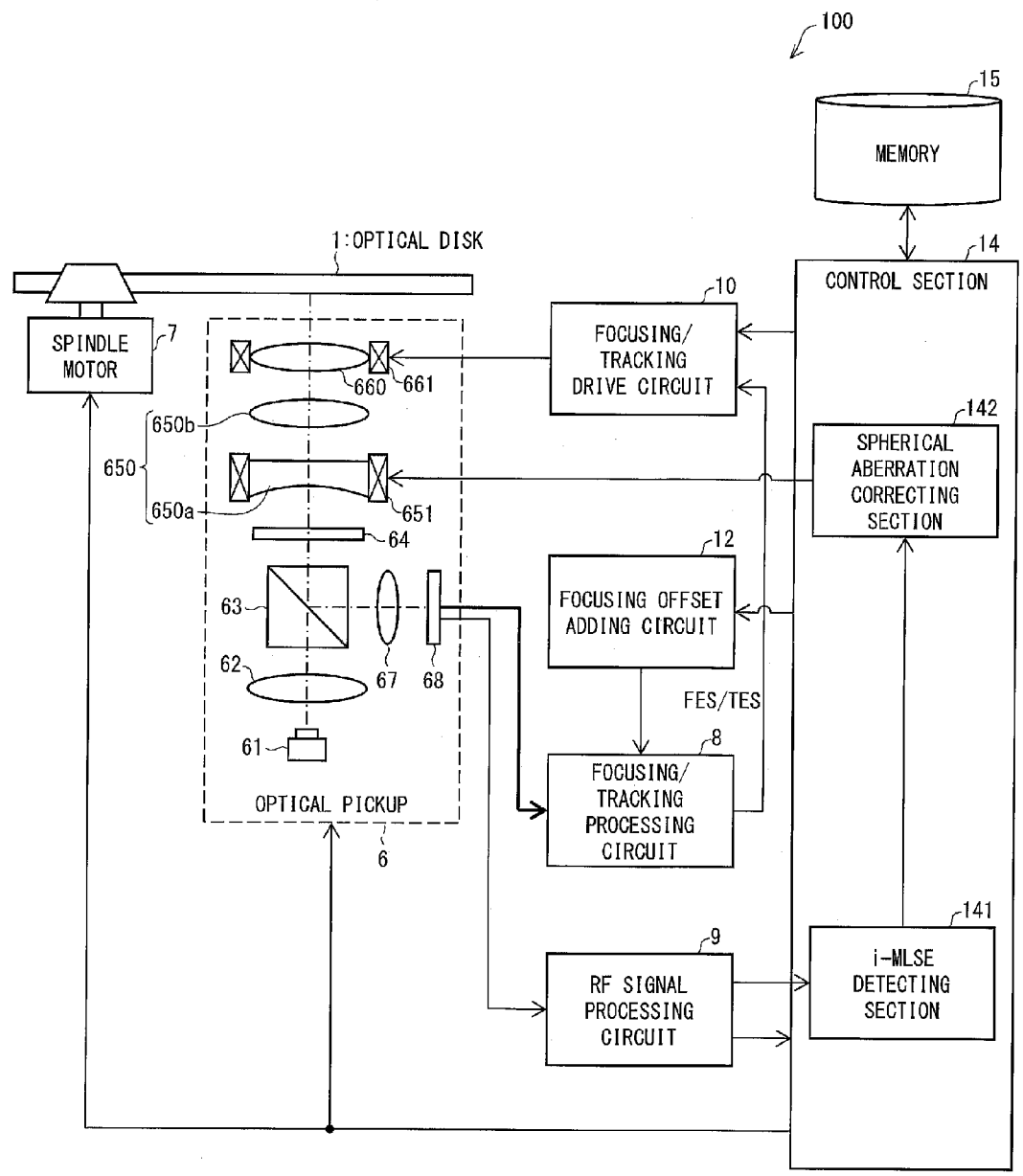
FIG. 1 is a functional block diagram schematically illustrating a configuration of a reproducing device in accordance with Embodiment 1 of the present invention.

FIG. 1 is a functional block diagram schematically illustrating a configuration of a reproducing device 100 for reproducing an optical disk 1. The reproducing device 100 includes an optical pickup 6 (irradiation section), a spindle motor 7, a focusing/tracking processing circuit 8, an RF (Radio Frequency) signal processing circuit 9 (conversion section), a focusing/tracking drive circuit 10, a focusing offset adder circuit 12, a control section 14, and a memory 15.

The optical disk 1 is a read-only optical information recording medium (see FIG. 4 (later described)). In the optical disk 1, information such as content is recorded in a form of a pit group which includes one or more pits shorter than an optical system resolution limit of the reproducing device 100 or a reproducing device capable of reproducing the optical disk 1. Note that a configuration of the optical disk 1 will be later described. The optical disk 1 is driven and rotated by the spindle motor 7.

The optical pickup 6 irradiates, to the optical disk 1, laser beam light (optical beam) serving as reproduction light, so as to reproduce content recorded on the optical disk 1. The optical pickup 6 includes a semiconductor laser 61, a collimating lens 62, a beam splitter 63, a λ/4 plate 64, a condensing lens 67, a light detector 68, a spherical aberration correcting optical system 650, an optical system drive mechanism 651 for correction of spherical aberration, an objective lens 660, and a focusing/tracking actuator 661.

The semiconductor laser 61 emits laser beam light having a given light intensity (reproduction power). The laser beam light emitted from the semiconductor laser 61 enters the spherical aberration correcting optical system 650, via the collimating lens 62, the beam splitter 63, and the λ/4 plate 64.

The collimating lens 62 forms parallel light. The beam splitter 63 splits the parallel light into transmitted light and reflected light. The λ/4 plate 64 dephases, by a quarter wavelength, a wavelength of the transmitted light.

The spherical aberration correcting optical system 650 has a function of correcting a spherical aberration caused by a thickness error of a light transmitting layer 4 (transmissive substrate, cover layer) of the optical disk 1. The spherical aberration correcting optical system 650 is, for example, a beam-expanding relay lens in which a concave lens 650a and a convex lens 650b are combined. The spherical aberration correcting optical system 650 is typically configured such that parallel light, which is obtained by expanding a beam diameter of parallel light which has entered the spherical aberration correcting optical system 650, exits from the spherical aberration correcting optical system 650. By changing a lens interval between the concave lens 650a and the convex lens 650b, parallel light which enters the objective lens 660 is converted into divergent light or focusing light. This causes a spherical aberration, caused by the objective lens 660, to be adjusted.

The optical system drive mechanism 651 adjusts a lens interval between the concave lens 650a and the convex lens 650b. The optical system driving mechanism 651 allows the spherical aberration correcting optical system 650 to carry out a function of correcting a spherical aberration caused by a variation in thickness of the light transmitting layer 4 of the optical disk 1.

The objective lens 660 converges, onto an information recording layer 3 (see FIG. 4 (later described)) provided on the optical disk 1, laser beam light which has exited from the spherical aberration correcting optical system 650. The light detector 68 detects light which reflected off the optical disk 1.

The light detector 68 converts light, which reflected off the optical disk 1, into an electrical signal in accordance with an intensity of the light which reflected off the optical disk 1. The light detector 68 then supplies the electrical signal to each of the focusing/tracking processing circuit 8 and the RF signal processing circuit 9.

The focusing/tracking processing circuit 8 (i) generates a focusing error signal (FES) and a tracking error signal (TES) and (ii) supplies the FES signal and the TES signal to the focusing/tracking drive circuit 10.

The focusing/tracking drive circuit 10 generates a focusing drive signal in accordance with the FES signal. Further, the focusing/tracking drive circuit 10 drives the focusing/tracking actuator 661 so as to carry out a focusing operation.

In the focusing operation, the objective lens 660 is displaced in a direction perpendicular to a disk surface of the optical disk 1.

The focusing/tracking drive circuit 10 generates a tracking drive signal in accordance with the TES signal. Further, the focusing/tracking driving circuit 10 drives the focusing/tracking actuator 661 so as to carry out a tracking operation. In tracking operation, the objective lens 660 is displaced in a radial direction (tracking direction) of the optical disk 1.

Note that it is possible to employ, as a method of detecting a focusing error signal, a well-known method such as an astigmatism method, a knife edge method, or a spot size detection method. Note also that it is possible to employ, as a method of detecting a tracking error, a well-known method such as a push-pull method, a DPP (Differential Push-Pull) method, or a DPD (Differential Phase Detection) method.

The RF signal processing circuit 9 converts, into a reproduction signal (RF signal) indicative of information (content), light that reflected off the optical disk 1 which was irradiated with reproduction light. The reproduction signal thus converted is supplied to the control section 14 (particularly, an i-MLSE (Integrated-Maximum Likelihood Sequence Estimation) detecting section 141).

The control section 14 controls the optical pickup 6, the spindle motor 7, and servo systems. For example, in a case where the reproducing device 100 is loaded with the optical disk 1, the control section 14 controls the spindle motor 7 so that the optical disk 1 is driven and rotated under an operating condition in which, for example, a linear velocity is constant or a number of revolutions is constant.

The control section 14 has a function of, for example, processing evaluation indices such as an i-MLSE, an amplitude of RF signal, and jitter. The control section 14 controls the memory 15 so that (i) a spherical aberration correcting value is stored/written therein and (ii) a spherical aberration correcting value is read out thereof. The memory 15 stores therein initial setting values of the reproducing device 100.

After pre-processes (such as rotation of the optical disk 1 and turn-on of the semiconductor laser 61) end, the control section 14 controls the focusing/tracking drive circuit 10 to start focusing control. In doing so, the focusing/tracking processing circuit 8 supplies, to the focusing/tracking drive circuit 10, an FES signal which has been generated by carrying out a suitable process such as phase compensation. This causes the focusing/tracking drive circuit 10 to carry out the focusing control.

The control section 14 controls the focusing offset adder circuit 12 to make an offset adjustment of the focusing control. By adding an offset to a servo control loop, a focusing state of a beam spot on the optical disk 1 is adjusted.

The control section 14 controls the focusing/tracking drive circuit 10 to start tracking control. In doing so, the focusing/tracking processing circuit 8 supplies, to the focusing/tracking drive circuit 10, a TES signal which has been generated by carrying out a suitable process such as phase compensation. This causes the focusing/tracking drive circuit 10 to carry out the tracking control.

The control section 14 supplies a track jump signal to the focusing/tracking drive circuit 10. This causes the focusing/tracking drive circuit 10 to supply a track jump driving signal to a tracking coil (not illustrated) provided in the focusing/tracking actuator 661. Thus, tracking jump control is carried out. Note that the focusing control, the tracking control, and the tracking jump control can be carried out by respective suitable well-known methods.

The control section 14 includes the i-MLSE detecting section 141 (signal quality evaluating section) and a spherical aberration correcting section 142. The RF signal processing circuit 9 converts, into an electrical signal, light which reflected off the information recording layer 3 provided on the optical disk 1. In the RF signal processing circuit 9, the electrical signal is subjected to processing, such as adjustment of a size of an electrical signal and AD conversion suitable for various types of calculation to be carried out in the i-MLSE detecting section 141. This causes the electrical signal to be converted into a reproduction signal. The RF signal processing circuit 9 supplies the reproduction signal to the i-MLSE detecting section 141. Operations of the i-MLSE detecting section 141 and the spherical aberration correcting section 142 will be described later in detail.

Note that, in the reproducing device 100, (i) reproduction light, emitted from the semiconductor laser 61, is set to have a wavelength of 405 nm and (ii) an optical system, provided in the optical pickup 6, is set to have a numerical aperture (a numerical aperture (NA) of the objective lens 660) of 0.85. Note, however, that Embodiment 1 is not limited to this and it is therefore possible to set as appropriate, in accordance with a type of the optical disk 1, a wavelength and a numerical aperture other than the wavelength of 405 nm and the numerical aperture of 0.85, respectively.

<Process of Reproducing Device>

Figure 2:
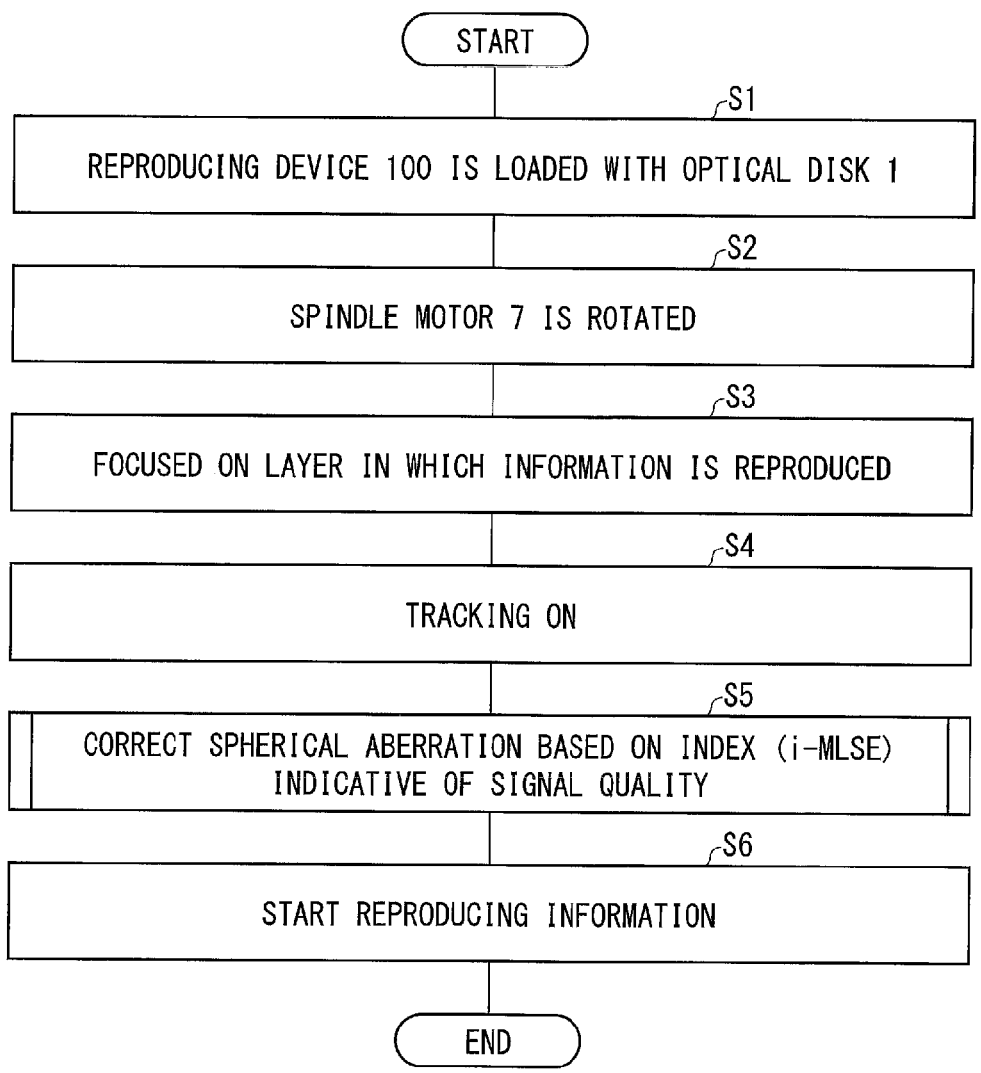
FIG. 2 is a view showing an example flow of how a reproduction operation is carried out with respect to an optical disk 1 in the reproducing device in accordance with Embodiment 1 of the present invention.

FIG. 2 is a flow chart showing an example flow of how a reproduction operation is carried out (control method and reproduction method) with respect to the optical disk 1 in the reproducing device 100.

First, the reproducing device 100 is loaded with the optical disk 1 (process S1). The control section 14 of the reproducing device 100 recognizes, by use of a sensor (not illustrated) provided in the control section 14, that the reproducing device 100 is loaded with the optical disk 1.

Subsequently, after the control section 14 confirms that the reproducing device 100 is loaded with an optical disk 1, the control section 14 controls the spindle motor 7 to rotate (process S2). This causes the optical disk 1 to be driven and rotated under an operating condition in which, for example, a linear velocity is constant or a number of revolutions is constant. The control section 14 carries out various settings with respect to the reproducing device 100 in accordance with the initial setting values stored in the memory 15.

Subsequently, the control section 14 controls the focusing/tracking drive circuit 10 so that the objective lens 660 is focused on the information recording layer 3 of the optical disk 1, in which information recording layer 3 information to be reproduced is recorded (process S3). The control section 14 then controls the focusing/tracking drive circuit 10 to carry out tracking of the objective lens 660 (process S4). That is, in the processes S3 and S4, the optical disk 1 is irradiated with the reproduction light from the optical pickup 6 (irradiating step). This causes a reproduction signal to be generated based on light which reflected off the optical disk 1 (converting step).

Subsequently, the control section 14 corrects a spherical aberration based on an index (i-MLSE) indicative of signal quality (process S5; signal quality evaluating step, spherical aberration correcting step). The control section 14 then starts reproducing information recorded on the optical disk 1, by using a spherical aberration correcting value which has been determined in the process S5 (process S6). The following description specifically discusses the process S5 with reference to FIG. 3.

(Process Flow of Correcting Spherical Aberration)

Figure 3:
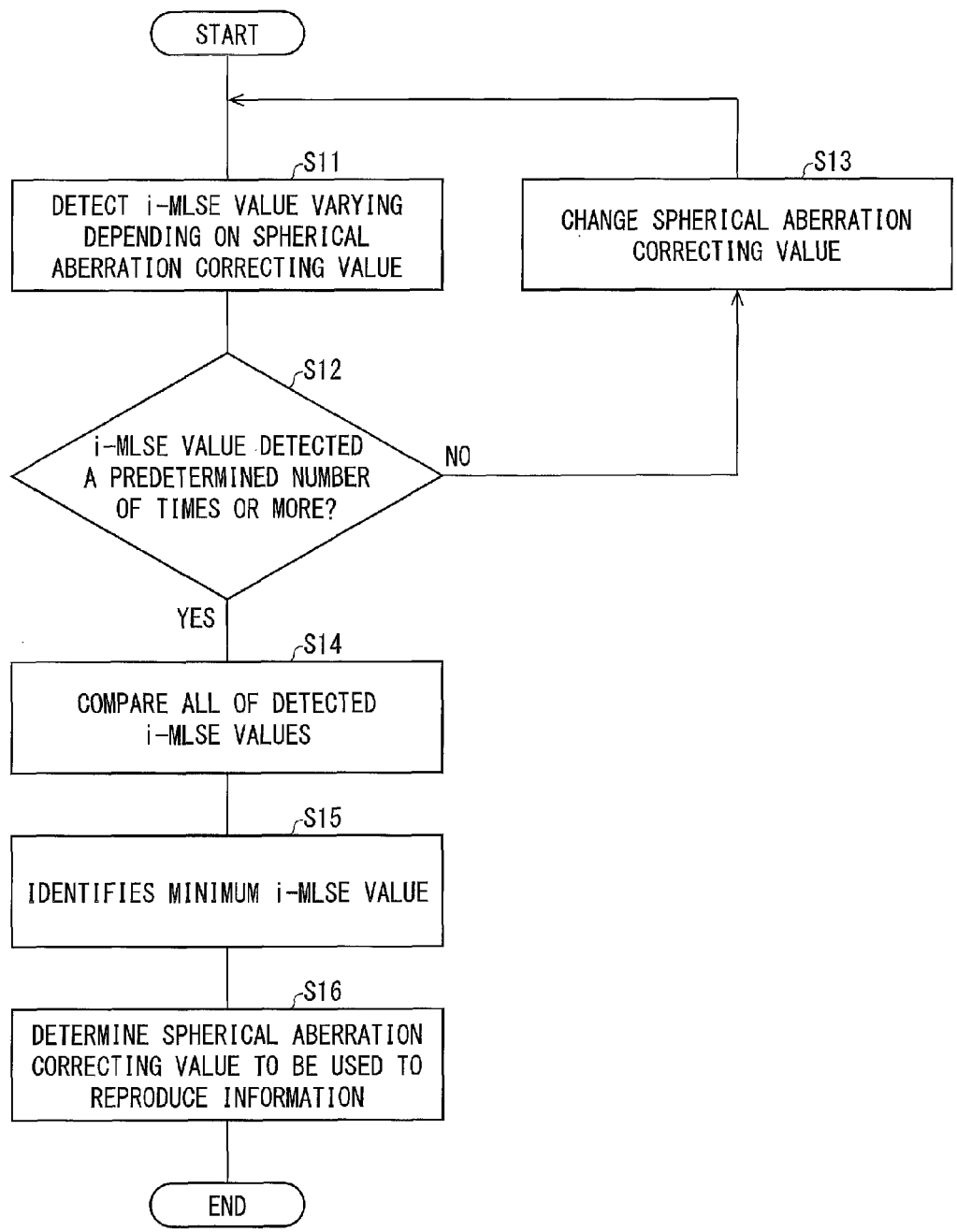
FIG. 3 is a view specifically showing an example of the process (process of correcting a spherical aberration) illustrated in FIG. 2.

FIG. 3 is a flow chart specifically showing an example of the process S5 (process of correcting a spherical aberration) illustrated in FIG. 2. The following description discusses a process to be carried out after the RF signal processing circuit 9 supplies a reproduction signal to the i-MLSE detecting section 141 provided in the control section 14.

The i-MLSE detecting section 141 detects, in accordance with the reproduction signal supplied from the RF signal processing circuit 9, an i-MLSE value varying depending on a spherical aberration correcting value which is currently set (process S11). Subsequently, the i-MLSE detecting section 141 stores, in the memory 15, the i-MLSE value thus detected so that the i-MLSE value is associated with the spherical aberration correcting value currently set.

Note that the i-MLSE refers to one of evaluation indices, which are used to evaluate a signal characteristic of a reproduction signal of information recorded at a high density. A reproduction signal has a better signal characteristic as the i-MLSE value is smaller. The i-MLSE can be also considered as an evaluation index similar to jitter, which is a conventional evaluation index.

The spherical aberration correcting value refers to an amount which is used to correct a focusing position of an optical system which focusing position has been displaced due to a spherical aberration. For example, in a case where the spherical aberration correcting value is 1 μm (−1 μm), the optical system is to be corrected so that a focal point of the optical system is brought closer, by 1 μm, to the semiconductor laser 61 (a focal point of the optical system is brought away, by 1 μm, from the semiconductor laser 61).

Subsequently, the i-MLSE detecting section 141 checks whether or not the i-MLSE detecting section 141 has detected an i-MLSE value a predetermined number of times (e.g., eight times) or more (process S12). Note that the predetermined number of times refers to a value that the control section 14 has set in advance, as the number of processes to be repeated for detecting an i-MLSE value, within a range of spherical aberration correcting values which are usable in the reproducing device 100.

In a case where the i-MLSE detecting section 141 has detected an i-MLSE value less than the predetermined number of times (NO in process S12), the i-MLSE detecting section 141 provides an instruction to the spherical aberration correcting section 142. In response to the instruction, the spherical aberration correcting section 142 (i) changes the spherical aberration correcting value and (ii) controls the optical system drive mechanism 651 (process S13). The spherical aberration correcting section 142 then stores, in the memory 15, the spherical aberration correcting value thus changed.

Note that the spherical aberration correcting value can be changed in accordance with a given routine. The following description discusses, as an example, a case where the range of the spherical aberration correcting values, which are usable in the reproducing device 100, is not less than −4 μm and not less than 3 μm.

In a case where an initial setting value of the spherical aberration correcting value is set to −4 μm, it is preferable to increase the spherical aberration correcting value by 1 μm (i.e., from −4 μm to −3 μm, ... , from 1 μm to 2 μm, from 2 μm to 3 μm) every time an i-MLSE value is detected. Meanwhile, in a case where the initial setting value of the spherical aberration correcting value is set to 3 μm, it is possible to reduce the spherical aberration correcting value by 1 μm (i.e., from 3 μm to 2 μm, ... , from −2 μm to −3 μm, from −3 μm to −4 μm) every time an i-MLSE value is detected. This causes the i-MLSE detecting section 141 to detect, as a result of carrying out the detection the predetermined number of times (eight times), a plurality of i-MLSE values within the range of the spherical aberration correcting values which are usable in the reproducing device 100.

Note that the initial setting value of the spherical aberration correcting value is stored in advance in the memory 15. In accordance with specifications of the reproducing device 100 and the optical disk 1, (i) the initial setting value of the spherical aberration correcting value and (ii) a range within which the spherical aberration correcting value can fall are preferably set as appropriate. The processes S11 through S13 described above are repeated until the i-MLSE detecting section 141 detects i-MLSE values the predetermined number of times or more. This causes i-MLSE values for respective spherical aberration correcting values to be stored in the memory 15.

In a case where the i-MLSE detecting section 141 detects i-MLSE values the predetermined number of times or more (YES in process S12), the i-MLSE detecting section 141 compares all of the i-MLSE values thus detected with each other (process S14). The i-MLSE detecting section 141 then identifies a minimum i-MLSE value (process S15).

The i-MLSE detecting section 141 (i) reads out, from the memory 15, a spherical aberration correcting value corresponding to the minimum i-MLSE value and (ii) determines a spherical aberration correcting value to be used to reproduce information (process S16). Upon receipt of an instruction from the i-MLSE detecting section 141, the spherical aberration correcting section 142 controls, in accordance with the spherical aberration correcting value, the optical system drive mechanism 651 to correct a spherical aberration (spherical aberration correcting step).

In the processes S1 through S6 and the processes S11 through S16 (signal quality evaluating step), the i-MLSE detecting section 141 (i) detects i-MLSE values and (ii) evaluates quality of a reproduction signal. This allows the reproducing device 100 to reproduce the optical disk 1 by using a spherical aberration correcting value at which the i-MLSE value becomes minimum.

Embodiment 1 describes an example arrangement in which the i-MLSE detecting section 141 and the spherical aberration correcting section 142 are provided in the control section 14. Note, however, that the arrangements of the i-MLSE detecting section 141 and the spherical aberration correcting section 142 are not limited to this. Alternatively, the i-MLSE detecting section 141 and the spherical aberration correcting section 142 can be provided outside of the control section 14 so as to operate in conjunction with the control section 14.

<Configuration of Optical Disk>

The inventors of the present application carried out experiments for demonstrating an effect of Embodiment 1, with respect to two types of optical disks A and B each having a configuration similar to that of the optical disk 1. Prior to descriptions of the experiments, the following description discusses a configuration of the optical disk 1 with reference to FIGS. 4 and 5.

Figure 4:
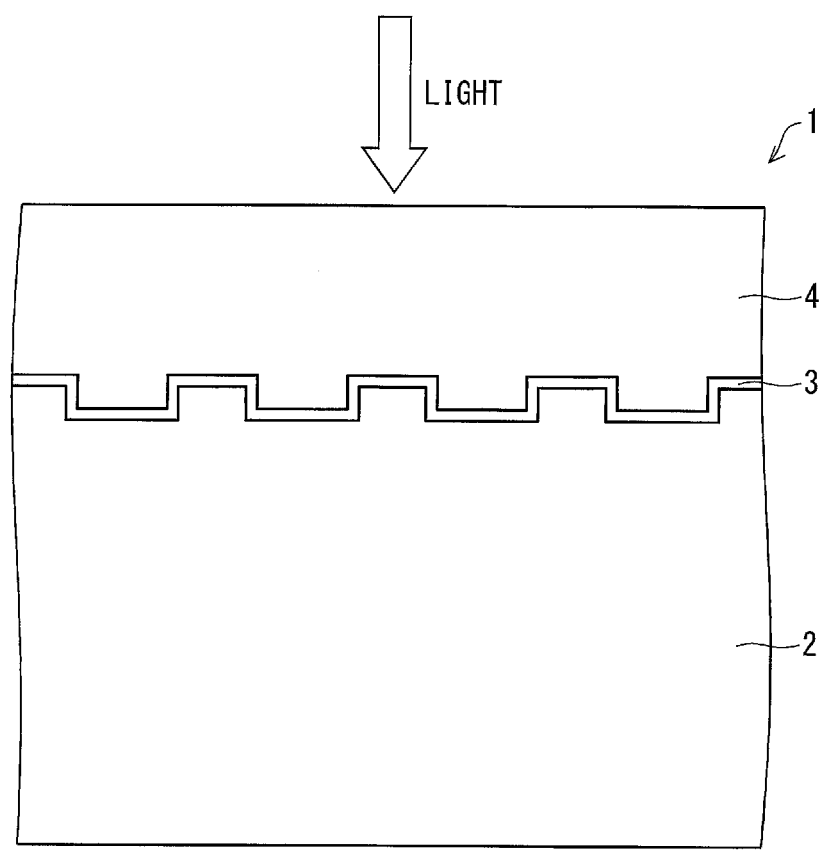
FIG. 4 is a cross sectional view illustrating an optical disk in accordance with Embodiment 1 of the present invention.

FIG. 4 is a cross sectional view illustrating an optical disk 1. The optical disk 1 is configured such that an information recording layer (functional layer) 3 and a light transmitting layer 4 are stacked on the substrate 2 in this order. In other words, the light transmitting layer 4, the information recording layer 3, and the substrate 2 are provided in this order in the optical disk 1, reproduction light being incident on the light transmitting layer 4. The optical disk 1 is a super-resolution medium including a mark (recording mark) or a space each being shorter than an optical system resolution limit.

The substrate 2 is made of polycarbonate. A pit group is provided on a surface (information recording surface) of the substrate 2, on which surface the information recording layer 3 is provided. In the pit group, concavity and/or convexity each having a shape which varies depending information to be recorded.

The information recording layer 3 is a layer (thin film) (i) in which information is recorded and (ii) which is provided along the concavity and/or the convexity of the information recording surface of the substrate 2. The information recording layer 3 is a functional layer which enables super-resolution reproduction. The information recording layer 3 is a layer in which information is recorded. Recorded information is reproduced based on light which reflected off the layer. Specifically, the information recording layer 3 is a Ta thin film layer having a thickness of 12 nm.

The light transmitting layer 4 is made of ultraviolet cured resin (a refractive index is 1.50 for a reproduction light whose wavelength $\lambda$ is 405 nm) having a thickness of 100 µm. The light transmitting layer 4 (i) has a surface via which reproduction light enters and (ii) protects information recording surfaces of the information recording layer 3 and the substrate 2.

Figure 5:
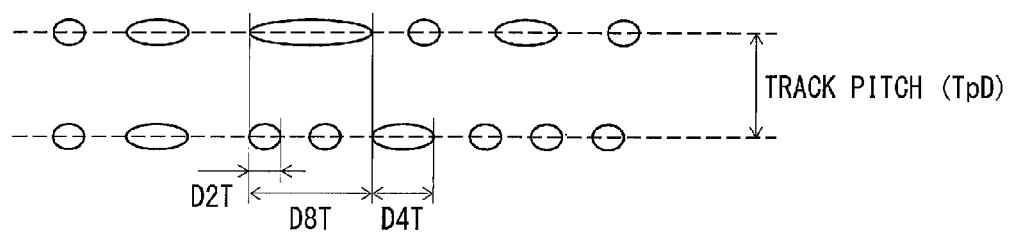
FIG. 5 is a plan view illustrating pre-pits provided on a substrate of the optical disk in accordance with Embodiment 1 of the present invention.

FIG. 5 is a plan view illustrating pits provided on the substrate 2 of the optical disk 1. In accordance with, for example, a (1,7) RLL (Run Length Limited) modulation method, information is recorded, on the optical disk 1, in a form of marks and spaces having a plurality of lengths (D2T through D8T).

Note that the pits provided on the optical disk 1 indicate respective marks, and a gap between the respective pits provided along a track indicates a space. The marks and spaces having a plurality of lengths are provided so that an average length of a minimum mark length (D2T) and a minimum space length is 112 nm, in a scanning direction of the reproducing device 100. Note that the average length is shorter than an optical system resolution limit (119 nm). In this case, the minimum mark length and the minimum space length are each D2T.

Note that a track pitch TpD of pits of the optical disk 1 is 0.32 µm which is identical with a standard BD (Blu-ray (registered trademark) disc)-ROM. According to the optical disk 1, the minimum mark length (112 nm) is shorter than a minimum mark length (149 nm) of the standard BD-ROM (25 GB on a φ120 mm disk (non-super-resolution medium)). This allows information to be recorded on the optical disk 1 at a high density. It is therefore possible that the optical disk 1 records information of approximately 33.3 GB on a φ120 mm disk.

Note that information recorded on an optical disk 1 can contain, as address information, information indicative of a reproduction position. A process to be carried out for such an optical disk will be later described in Embodiment 2.

The configuration of the optical disk 1 described above is merely illustrative. An alternative optical disk 1 can therefore include a plurality of information recording layers 3. Thicknesses of the respective layers of such an alternative optical disk 1 can be altered as appropriate in accordance with, for example, the number of layers to be provided.

<Experiment for Demonstration>

The inventors of the present application carried out experiments for demonstration by carrying out Experiment 1 and Experiment 2 with respect to each of optical disks A and B. Note that the optical disks A and B each have a configuration similar to that of the optical disk 1 described in FIG. 4, except for cutting conditions for forming pits. That is, the optical disk A differs, in shapes of pits, from the optical disk B.

(Experiment 1) An i-MLSE of each of the optical disks A and B was measured while changing a spherical aberration correcting value.

That is, Experiment 1 was carried out by use of (i) a BD evaluation system (DDU-1000 (manufactured by Pulstec Industrial Co., Ltd.)/reproducing optical system: reproduction light wavelength (λ) 405 nm, numerical aperture (NA) 0.85) and (ii) a BD evaluation signal detector (SD3) manufactured by Pulstec Industrial Co., Ltd. By use of the BD evaluation system and the BD evaluation signal detector, (i) a reproduction power and a reproduction speed were fixed to 1.0 mW and 7.38 m/s, respectively and (ii) a set value for spherical aberration correcting (i.e., an initial value of the spherical aberration correcting value) which set value corresponds to 100 μm, which is the thickness of the light transmitting layer, was set to 0 μm. An i-MLSE was then measured by changing the spherical aberration correcting value.

(Experiment 2) Amplitudes of RF signals of the respective optical disks A and B were measured while changing the spherical aberration correcting value. Experiment 2 was carried out by use of the devices and the experimental conditions which are similar to those used in Experiment 1.

<Result of Experiments for Demonstration>

Figure 6:
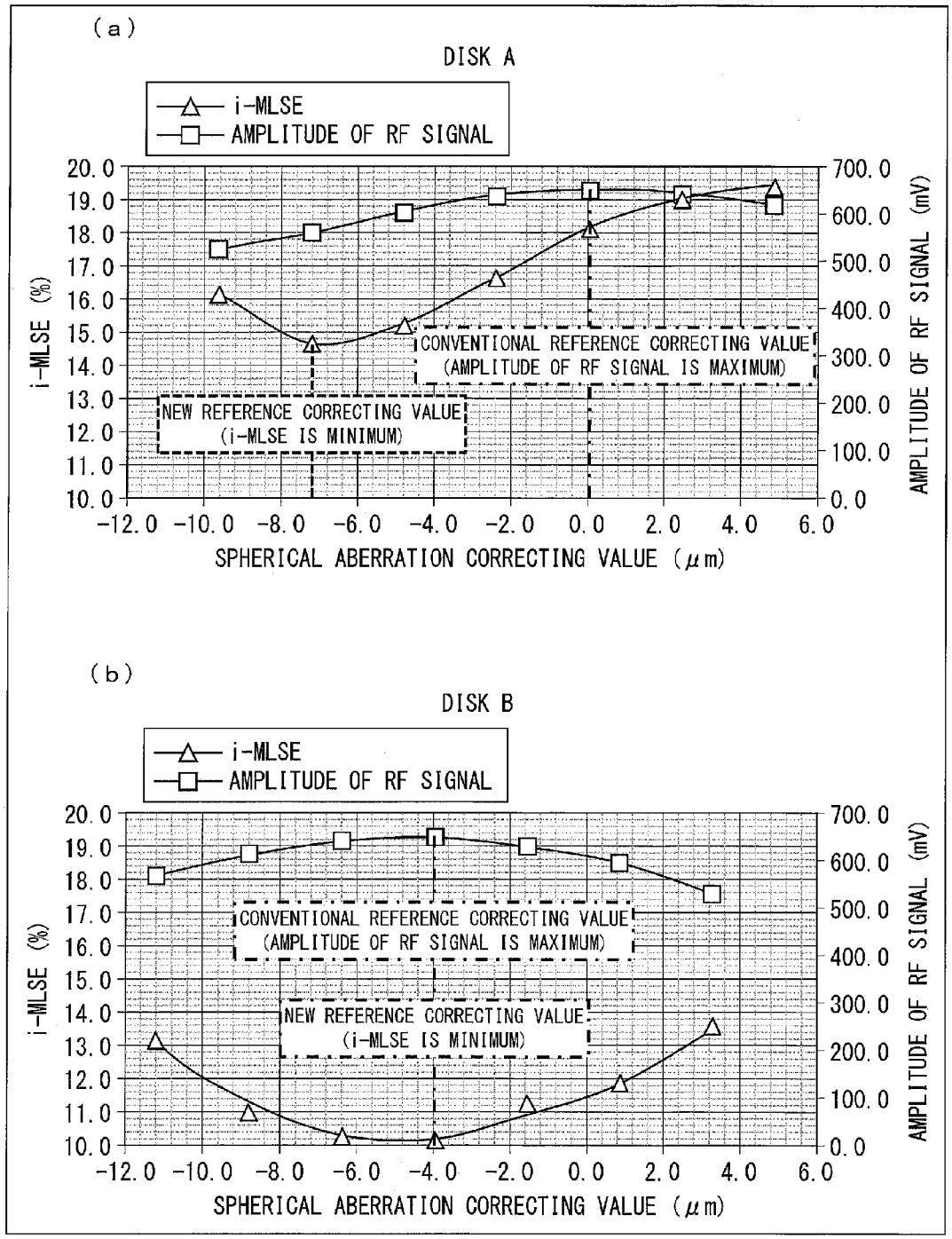
FIG. 6 shows, in (a) and (b), results of respective experiments for demonstration which have been carried out with respect to two different optical disks which are similar to the optical disk in accordance with Embodiment 1 of the present invention.

The following description discusses, with reference to (a) and (b) of FIG. 6, results of the experiments for demonstration which have been carried out with respect to the optical disks A and B.

(b) of FIG. 6 is a graph showing (i) a relationship between the spherical aberration correcting value and the i-MLSE and (ii) a relationship between the spherical aberration correcting value and the amplitude of the RF signal, which relationships were obtained as results of the experiments for demonstration which have been carried out with respect to the optical disk B. In (b) of FIG. 6, a spherical aberration correcting value obtained when the i-MLSE becomes minimum coincides with a spherical aberration correcting value obtained when the amplitude of the RF signal becomes maximum.

As shown in (b) of FIG. 6, even in a case of a read-only optical disk (i.e., the optical disk B, which is a super-resolution medium) in which information is recorded in a form of a pit group which includes one or more pits shorter than an optical system resolution limit, it is often the case that spherical aberration correcting values (new reference correction value) obtained when an i-MLSE becomes minimum (i.e., signal quality is best) coincides with a spherical aberration correcting value (conventional reference correcting value) obtained when an amplitude of an RF signal becomes maximum. Such a coincidence is similar to a read-only optical disk (i.e., a conventional optical disk which is a non-super-resolution medium) in which information is recorded in a form of a pit group including only pits longer than the optical system resolution limit.

Note that the super-resolution medium refers to an optical information recording medium in which information is reproduced by a super-resolution technique. Meanwhile, the non-super-resolution medium refers to a non-super-resolution region in which information is reproduced without using the super-resolution technique (i.e., in which information is unreproducible by the super-resolution technique).

Meanwhile, (a) of FIG. 6 is a graph showing (i) a relationship between the spherical aberration correcting value and the i-MLSE and (ii) a relationship between the spherical aberration correcting value and the amplitude of the RF signal, which relationships were obtained as results of the experiments for demonstration which have been carried out with respect to the optical disk A. In (a) of FIG. 6, a spherical aberration correcting value obtained when the i-MLSE becomes minimum does not coincide with a spherical aberration correcting value obtained when the amplitude of the RF signal becomes maximum.

As shown in (a) of FIG. 6, in a case of a read-only optical disk (i.e., the optical disk A, which is a super-resolution medium) in which information is recorded in a form of a pit group which includes one or more pits shorter than an optical system resolution limit, it sometimes happens that a spherical aberration correcting value obtained when an i-MLSE becomes minimum (i.e., signal quality is best) greatly differs, depending on shapes of pits, from a spherical aberration correcting value obtained when an amplitude of an RF signal becomes maximum.

<Effect>

In general, reliability of an optical disk reproducing system (reproducing device) is damaged in a case where i-MLSE>15.5%. Note, however, that the i-MLSE value of the optical disk A becomes approximately 18% in a case of a spherical aberration correcting value obtained when the amplitude of the RF signal becomes maximum.

Consequentially, in a case of a conventional reproducing device which determines a spherical aberration correcting value based on an amplitude of an RF signal, it sometimes happens that information reproduction with high reliability will not be carried out with respect to a super-resolution medium (e.g., the optical disk A). That is, it sometimes happens that the conventional reproducing device will not carry out information reproduction with inherent signal quality of the super-resolution medium.

In contrast, the reproducing device 100 of Embodiment 1 determines a spherical aberration correcting value based on an index (i.e., i-MLSE value), itself, indicative of signal quality. Specifically, in a case where the reproducing device 100 reproduces the optical disk A, an i-MLSE value becomes approximately 14%. In a case where the reproducing device 100 reproduces the optical disk B, an i-MLSE value becomes approximately 10%.

That is, the reproducing device 100 makes it possible to carry out information reproduction with inherent signal quality of the optical disk 1 which is the super-resolution medium. This brings about an effect of increasing reliability of each reproduction of the optical disks A and B.

More specifically, the reproducing device 100 includes the i-MLSE detecting section 141 and the spherical aberration correcting section 142. The i-MLSE detecting section 141 evaluates quality of a reproduction signal which has been converted by the RF signal processing circuit 9. The spherical aberration correcting section 142 corrects a spherical aberration caused by the optical pickup 6, by use of a result of evaluation of the quality (i.e., i-MLSE value) of the reproduction signal which quality has been evaluated by the i-MLSE detecting section 141.

Unlike the reproducing device 100 of Embodiment 1, the conventional reproducing device has reproduced the optical disk 1 by using not the spherical aberration correcting value obtained when the i-MLSE value becomes minimum but the spherical aberration correcting value obtained when the amplitude (reflectance) of the RF signal becomes maximum. That is, the conventional reproducing device (i) has changed the spherical aberration correcting value by use of an RF signal amplitude detector which is also used during a layer jump to each layer and (ii) has selected, as a spherical aberration correcting value to be used to reproduce information, the spherical aberration correcting value obtained when the amplitude of the RF signal becomes maximum.

This is because (i) a person skilled in the art has recognized as common knowledge that, in a signal characteristic of a reproduction signal, return light, caused by the reflectance of the optical information recording medium, is proportional to an amount of light which is received by the reproducing device and (ii) spherical aberration corrections made by other methods causes an increase in cost. As has been described, however, it becomes clear that reproduction of a super-resolution medium will never be carried out with inherent signal quality of the super-resolution medium, depending on shapes of pits of the super-resolution medium.

Unlike a conventional case where the spherical aberration is corrected by use of the amplitude of the RF signal, since the reproducing device 100 includes the i-MLSE detecting section 141 and the spherical aberration correcting section 142, it is capable of accurately reproducing information, such as content, recorded on unspecified number of super-resolution media.

The reproducing device 100 of Embodiment 1 brings about a further effect of determining a suitable spherical aberration correcting value in a smaller reproduction range (i.e., smaller population parameter) of the optical disk 1, as compared with a reproducing device 200 of Embodiment 2 (later described).

Alternatively, it is conceivable to employ a configuration in which a jitter value is used as an index indicative of the signal quality. In a case where jitter is detected, however, it is impossible to correctly evaluate signal quality of a pit group which includes one or more pits shorter than an optical system resolution limit. This requires many additional components (functions) in order to determine a suitable spherical aberration correcting value.

In contrast, since the reproducing device 100 uses the i-MLSE value as the index indicative of the signal quality, it has an advantage in that components and cost are reduced, as compared with the arrangement in which a jitter value is used as the index indicative of the signal quality.

Embodiment 2

Figure 7:
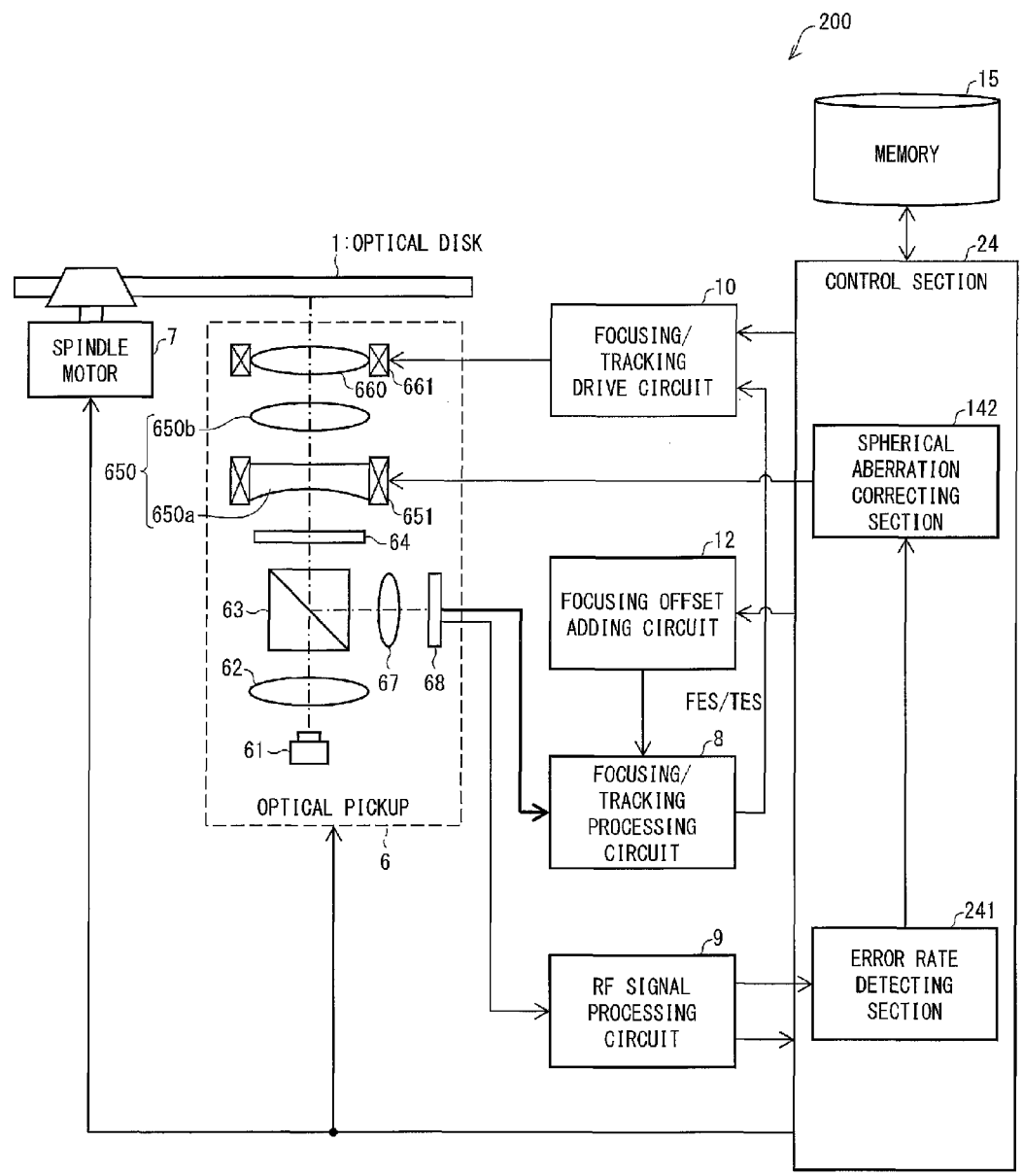
FIG. 7 is a functional block diagram schematically illustrating a configuration of a reproducing device reproducing device in accordance with Embodiment 2 of the present invention.

The following description discusses another embodiment of the present invention with reference to FIG. 7. Note that, for convenience, members which have functions identical to those of Embodiment 1 are given identical reference numerals, and are not described repeatedly.

<Configuration of Reproducing Device>

FIG. 7 is a functional block diagram schematically illustrating a configuration of the reproducing device 200 of Embodiment 2. The reproducing device 200 of Embodiment 2 has a configuration obtained by replacing, with a control section 24, the control section 14 of the reproducing device 100 of Embodiment 1. Note that other members of the reproducing device 200 of Embodiment 2 are identical to those of the reproducing device 100 of Embodiment 1. Such members are thus given identical reference numerals, and are not described repeatedly.

The control section 24 includes an error rate detecting section 241 (signal quality evaluating section, address information error detecting section) and a spherical aberration correcting section 142. The control section 24 of Embodiment 2 is obtained by replacing, with the error rate detecting section 241, the i-MLSE detecting section 141 of the control section 14 of Embodiment 1.

An RF signal processing circuit 9 supplies a reproduction signal to the error rate detecting section 241. The error rate detecting section 241 then extracts, from the reproduction signal, address information (known) indicative of a reproduction position.

The error rate detecting section 241 detects an error rate from the address information. The error rate detecting section 241 calculates, for example, a bit error rate (bER) based on the address information so as to detect the bER as the error rate.

The bER is indicative of a ratio of the number of error bits Ne to the total number of decoding bits Nt, which error bits Ne are contained in a result obtained by decoding a reproduction signal which is obtained when a pit recorded on the optical disk 1 is reproduced. The bER is represented as bER=Ne/Nt.

Note that information to be used by the error rate detecting section 241 is not limited to the address information, provided that the information is known information.

As with the processes S11 through S16 earlier described, the error rate detecting section 241 determines a spherical aberration correcting value obtained when the error rate (result of evaluation of quality) becomes minimum. The reproducing device 200 starts information reproduction of the optical disk 1 as with the process S6.

<Effect>

The reproducing device 200 includes the error rate detecting section 241 which evaluates quality of the reproduction signal by detecting an error rate of address information contained in a reproduction signal. This allows the reproducing device 200 to determine a spherical aberration correcting value based on the error rate. That is, the reproducing device 200 uses the error rate as an index indicative of signal quality.

As with the reproducing device 100 (the configuration which uses the i-MLSE value as the index indicative of the signal quality) of Embodiment 1, the reproducing device 200 of Embodiment 2 therefore makes it possible to carry out information reproduction with the inherent signal quality of the optical disk 1 which is a super-resolution medium. This brings about an effect of increasing reliability of each reproduction of the optical disks A and B. That is, it is possible to accurately reproduce information, such as content, recorded on unspecified number of super-resolution media.

It is necessary to specify a standard reproduction position of the optical disk 1 (i.e., a position, to be reproduced, out of positions at which user data, such as content, is recorded). A reproducing device therefore normally has a function of detecting an address from a reproduced RF signal (reproduction signal supplied from the RF signal processing circuit 9).

Accordingly, the reproducing device 200 brings about an effect of determining a suitable spherical aberration correcting value, without adding, to the reproducing device 200, a new function for detecting the index indicative of the signal quality.

Note that, since the reproducing device 200 has a difficulty in calculating a bER based on content information, it is impossible to use, as the index indicative of the signal quality, the bER calculated based on the content information. This is because address information of a ROM normally contains no known information other than the address information. It is therefore impossible to calculate a significant bER based on the information in the ROM.

Embodiment 3

The following description discusses a further embodiment of the present invention with reference to FIGS. 8 through 11. Note that, for convenience, members which have functions identical to those of Embodiments 1 and 2 are given identical reference numerals, and are not described repeatedly.

<Configuration of Optical Disk>

Figure 8:
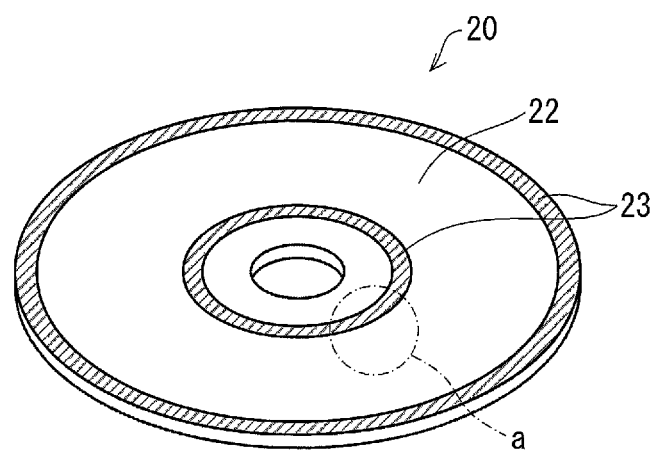
FIG. 8 is a perspective view illustrating an external appearance of an optical disk in accordance with Embodiment 3 of the present invention.
Figure 9:
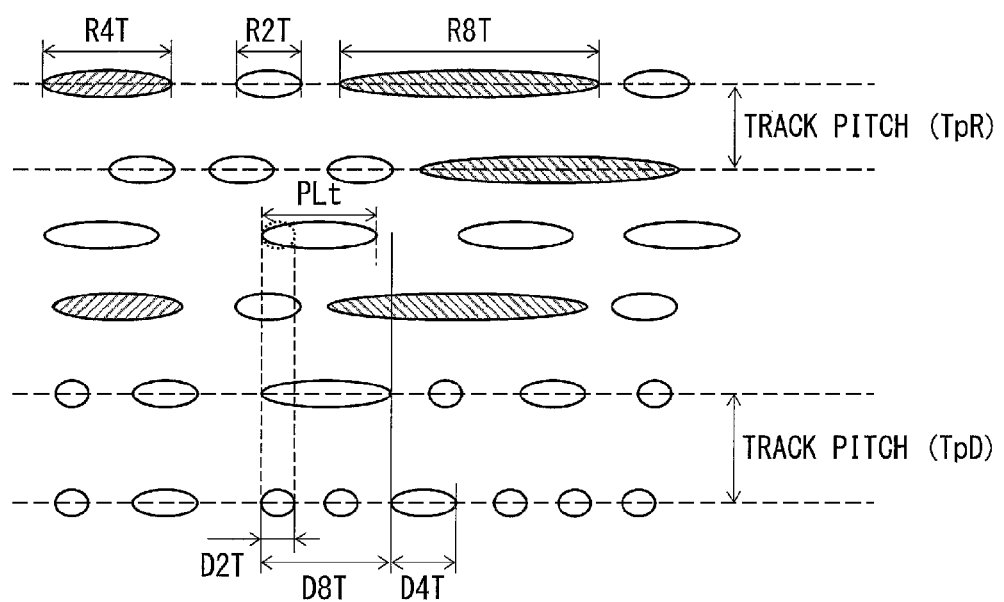
FIG. 9 is a plan view specifically illustrating a part of the optical disk illustrated in FIG. 9.

FIG. 8 is a perspective view illustrating an external appearance of an optical disk 20 to be reproduced by a reproducing device 300 of Embodiment 3. FIG. 9 is a plan view specifically illustrating a part a of the optical disk 20 illustrated in FIG. 8.

As illustrated in FIG. 8, according to the optical disk 20, a data region 22 (first region) and medium information regions 23 (second regions) are provided in advance. In the data region 22, for example, information, such as content, is recorded, and in the medium information regions 23, for example, information (i.e., medium information) regarding the optical disk 20 is recorded. That is, the optical disk 20 differs from the optical disk 1 of Embodiment 1 in that the optical disk 20 further includes the medium information regions 23.

Examples of the information regarding the optical disk 20 encompass (i) medium identification information indicating that the optical disk 20 has the data region 22, (ii) reproduction speed information that the reproducing device 300 uses when reproducing the optical disk 20, (iii) a medium unique number for copy protection, and (iv) region position information for specifying a position in the data region 22. Note that the medium identification information is not limited to a specific one, provided that it identifies (specifies) a type of medium of the optical disk 20. It is sufficient that at least the data region 22 indicates a super-resolution recording region.

FIG. 9 is a view specifically illustrating the part a of the optical disk 20 illustrated in FIG. 8. As illustrated in FIG. 9, a plurality of pits are arranged, at intervals of given track pitch TpD, in the data region 22 so that the plurality of pits form a line in a circumferential direction. Similarly, a plurality of pits are arranged, at intervals of given track pitch TpR, in the medium information regions 23 so that the plurality of pits form a line in a circumferential direction.

A mark edge recording method, in which information is recordable by use of pits which vary in shape and size, is employed to record information in each of the data region 22 and the medium information regions 23. Embodiment 3 employs a modulation recording method (recording encoding method), referred to as a 1-7PP (1-7 Parity Preserve/Prohibit RMTR (Repeated Minimum Transition Run Length)), which is a type of the mark edge recording method. Specifically, pits are provided in each of the data region 22 and the medium information regions 23 by a modulation method which is a type of a (1,7) RLL (Run Length Limited) modulation. For example, information is recorded by use of pits (or recording marks) of 2T through 8T. In Embodiment 3, for convenience, lengths of the respective pits in the data region 22 will be indicated by "D2T through D8T" and lengths of the respective pits in the medium information regions 23 will be indicated by "R2T through R8T" (see FIG. 9).

Note that the above modulation increases a recording density as follows. Specifically, (i) bit string pattern of original information (information which has not been subjected to the modulation) is converted, without depending on the bit string pattern of the original information, into a recording pattern having a given frequency band width (i.e., combinations of recording marks and spaces which combinations are limited to several types combinations) and (ii) a minimal-length of the recording marks or of the spaces is increased so as to be longer than a minimal-length of recording marks or of spaces of the original information. In case of the 1-7PP modulation recording method, a frequency band width is limited by (i) converting a 2-bit unit of the original information into a 3 channel bit and (ii) modulating a recording pattern into which the bit string pattern of the original information has been converted so that lengths of recording marks and of spaces are limited to lengths of 2 channel bit (2T) through 8 channel bit (8T). This causes minimal-lengths of the recording marks and of the spaces to become 1.5 times of those of the original information. Accordingly, the modulation by use of the 1-7PP modulation recording method is suitable for high density recording. Note that the modulation method to be employed is not limited to the 1-7PP modulation. Alternatively, it is possible to employ other modulation methods, suitable for high density recording, such as (i) (1,7) RLL modulation other than the 1-7PP modulation, (ii) 8/16 modulation, and (iii) (2,7) RLL modulation.

That is, a reason that information is recorded by using, for example, the (1,7) RLL modulation, in which information is recorded by use of pits or recording marks varying in length, is that the recording density is increased by recording information by use of pits or recording marks which have identical lengths.

As illustrated in FIG. 8, the data region 22 is provided between the medium information regions 23. The content is recorded in the data region 22 by providing, in the data region 22, pits which include concavity and/or convexity when a substrate is formed. The pits each have a length of D2T through D8T shown in FIG. 9. The minimal pit length D2T is shorter than an optical system resolution limit of the reproducing device 300. The content is recorded so as to include a pit shorter than the optical system resolution limit of the reproducing device 300 (super-resolution recording). This allows the optical disk 20 to record content at a higher recording density, as compared with a conventional medium.

As illustrated in FIG. 8, the medium information regions 23 are provided in advance in each of an innermost circumferential part of and an outermost circumferential part of the optical disk 20. Information regarding the super-resolution medium 1 is recorded in the medium information regions 23 in a form of pits including concavity and/or convexity. The pits each have a length of R2T through R8T (see FIG. 9). The minimal pit length R2T is not less than the optical system resolution limit of the reproducing device 300 (normal recording). To put it another way, (i) each of the pits, provided in the medium information regions 23, is longer than the minimal pit in the data region 22 and (ii) a recording density of information in the medium information regions 23 is lower than a recording density of information in the data region 22.

The medium information regions 23 are provided in the inner circumferential part and the outer circumferential part of the optical disk 20. Note, however, that the arrangement of the medium information regions 23 is not limited to this. Alternatively, the medium information regions 23 can be provided either in the inner circumferential part of or the outer circumferential part of the optical disk 20.

A cross-sectional configuration of the optical disk 20 is similar to that of the optical disk 1 of Embodiment 1. In other words, the optical disk 1 has a configuration similar to that of the data region 22. Further, also in the optical disk 1, formation of pits and recording of information do not need to be carried out by the (1,7) RLL modulation. Alternatively, it is possible to form the pits and record information on the optical disk 1 by each one of the various modulation methods described above, other than the (1,7) RLL modulation.

As has been described, the data region 22 is a super-resolution region in which (i) content is recorded in a form of a first pit group including one or more pits shorter than the optical system resolution limit of the reproducing device 300 and (ii) information, such as the content, is reproduced by the super-resolution technique. Meanwhile, the medium information regions 23 are each a non-super-resolution region in which (i) the medium identification information is recorded in a form of a second pit group including pits each having a length not less than the optical system resolution limit of the reproducing device 300 and (ii) information is reproduced without using the super-resolution technique (i.e., information is unreproducible by the super-resolution technique).

In other words, the optical disk 20 (i) is a read-only optical disk in which content is recorded in a form of pit group including one or more pits shorter than the optical system resolution limit and (ii) is an optical information recording medium in which information is reproducible by the so-called super-resolution technique.

Note that, due to the following reasons, the optical disk 20 of Embodiment 3 has the data region 22 and the medium information regions 23 as described above.

It is generally preferable that each of a super-resolution medium and a conventional medium is reproducible by a single reproducing device. That is, an optical information recording medium is preferably compatible with an optical information recording medium for use in each one of corresponding reproducing devices (i.e., recorded information is reproducible by each one of corresponding reproducing devices).

Note, however, that reproduction (i.e., super-resolution reproduction) of information recorded in a form of a pit group which includes one or more pits shorter than the optical system resolution limit requires reproduction power higher than a light intensity (reproduction power) of reproduction light with which a conventional medium is to be irradiated. Accordingly, in a case where the conventional medium is irradiated with reproduction light having reproduction power for the super-resolution reproduction, the conventional medium may be damaged.

As such, a reproducing device capable of reproducing each of the super-resolution medium and the conventional medium is preferably configured to (i) determine whether an optical information recording medium, which is subjected to a reproduction process, is a super-resolution medium or a conventional medium and (ii) in a case where the reproducing device determines that the optical information recording medium is the super-resolution medium, irradiate, the optical information recording medium with reproduction power for the super-resolution reproduction. That is, the reproducing device preferably increases a light intensity, from the reproduction power for the conventional medium to the reproduction power for the super-resolution reproduction, only in a case where the reproducing device determines that the optical information recording medium is the super-resolution medium.

The optical disk 20 has the data region 22 and the medium information regions 23 as described above. This allows the reproducing device, which is configured as described above so as to be capable of reproducing each of the super-resolution medium and the conventional medium, to irradiate each of the data region 22 and the medium information regions 23 with reproduction light having a corresponding suitable light intensity. That is, the optical disk 20 can function as an optical information recording medium which is compatible with an optical information recording medium for use in the reproducing device.

Note that it is conceivable to cause the reproducing device to identify an optical information recording medium as a super-resolution medium, by recording medium identification information on the optical information recording medium in a form of a pit group including one or more pits shorter than the optical system resolution limit so that the medium identification information is not reproducible even by irradiating the optical information recording medium with reproduction light having reproduction power for a conventional medium.

Note, however, that the reproducing device may, in some cases, not be able to reproduce medium identification information due to, for example, stain adhered to a surface of the conventional medium. In such a case, the reproducing device determines that (i) the medium identification information is not reproducible and (ii) an object to be reproduced is a super-resolution medium, even when such an object is actually a conventional medium. As such, the reproducing device irradiates the conventional medium with reproduction light having reproduction power for use in a super-resolution reproduction. This may cause the conventional medium to be damaged.

In view of the circumstances, the medium identification information is preferably provided in a form of a pit group including one or more pits not less than the optical system resolution limit, as has been described.

<Configuration of Reproducing Device>

Figure 10:
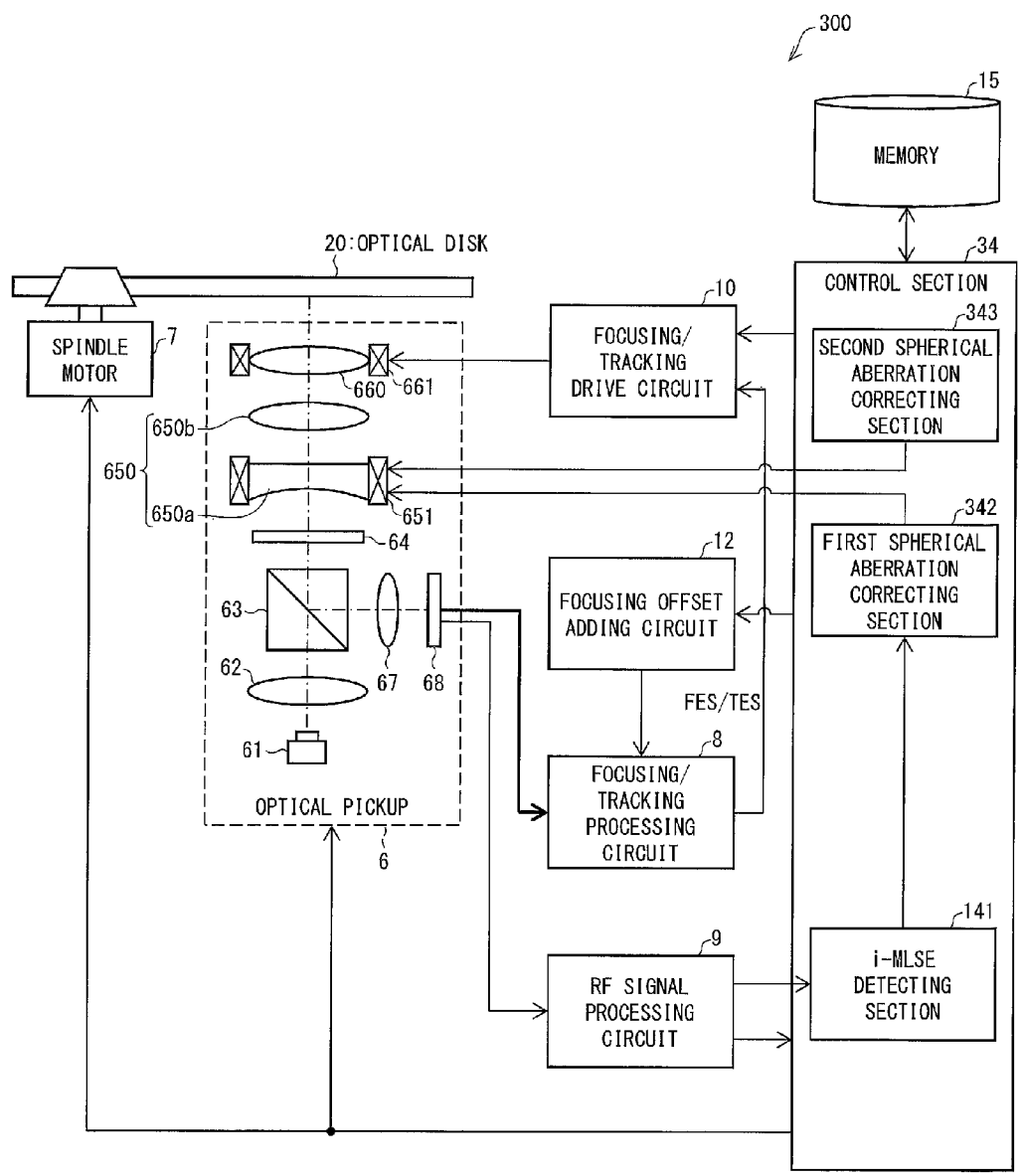
FIG. 10 is a functional block diagram schematically illustrating a configuration of a reproducing device in accordance with Embodiment 3 of the present invention.

FIG. 10 is a functional block diagram schematically illustrating a configuration of the reproducing device 300 of Embodiment 3. The reproducing device 300 of Embodiment 3 has a configuration obtained by replacing, with a control section 34, the control section 14 of the reproducing device 100 of Embodiment 1. Note that other members of the reproducing device 300 of Embodiment 3 are identical to those of the reproducing device 100 of Embodiment 1. Such members are thus given identical reference numerals, and are not described repeatedly.

The control section 34 includes an i-MLSE detecting section 141, a first spherical aberration correcting section 342, and a second spherical aberration correcting section 343. The control section 34 of Embodiment 3 can be obtained by (i) replacing the spherical aberration correcting section 142 of the control section 14 in accordance with Embodiment 1 with the first spherical aberration correcting section 342 and (ii) adding the second spherical aberration correcting section 343 to the control section 14.

The first spherical aberration correcting section 342 is a member similar to the spherical aberration correcting section 142, and specific description on the first spherical aberration correcting section 342 is therefore omitted. The first spherical aberration correcting section 342 corrects a spherical aberration by controlling an optical system drive mechanism 651 by using a spherical aberration correcting value obtained when an i-MLSE value becomes minimum.

The second spherical aberration correcting section 343 is a member similar to a spherical aberration correcting section provided in the conventional reproducing device. The second spherical aberration correcting section 343 corrects a spherical aberration by controlling the optical system drive mechanism 651 by using a spherical aberration correcting value obtained when an amplitude of an RF signal becomes maximum.

The reproducing device 300 is a reproducing device for reproducing the optical disk 20. The reproducing device 300 therefore needs to reproduce each of the data region 22 and the medium information regions 23.

The reproducing device 300 therefore includes, as two spherical aberration correcting sections, the first spherical aberration correcting section 342 and the second spherical aberration correcting section 343. The first spherical aberration correcting section 342 serves as a spherical aberration correcting section for reproducing the information recorded in the data region 22. The second spherical aberration correcting section 343 serves as a spherical aberration correcting section for reproducing the information recorded in the medium information regions 23.

In other words, in a case where the first spherical aberration correcting section 342 reproduces the information recorded in the data region 22, the first spherical aberration correcting section 342 corrects a spherical aberration by using a result (i-MLSE value) of evaluation of quality of a reproduction signal indicative of the content. In contrast, in a case where the second spherical aberration correcting section 343 reproduces the information recorded in the medium information regions 23, the second spherical aberration correcting section 343 corrects a spherical aberration by carrying out a process different from the first spherical aberration correcting.

In the data region 22, the information is recorded in a form of a pit group including one or more pits shorter than the optical system resolution limit. Accordingly, as has been described in Embodiment 1, the reproducing device 300 includes the first spherical aberration correcting section 342 for correcting a spherical aberration caused by variation in thickness of a light transmitting layer 4 of the optical disk 20 (super-resolution medium).

In contrast, in the medium information regions 23, the information is recorded in a form of a pit group including one or more pits not less than the optical system resolution limit. Accordingly, the first spherical aberration correcting section 342, which corrects the spherical aberration caused by variation in thickness of the light transmitting layer 4 of the optical disk 20, is not required. This is because, in a case where the first spherical aberration correcting section 342 corrects the spherical aberration during recording the information in the medium information regions 23 is reproduced, a difference between respective i-MLSE values which correspond to respective spherical aberration correcting values become smaller, and this may give rise to a difficulty in proper optimization of the spherical aberration. Furthermore, in a case where the error rate detecting section corrects the spherical aberration during the reproduction of the information in the medium information regions 23, it takes a good amount of time to optimize the spherical aberration. In view of the circumstances, it is preferable to correct the spherical aberration by use of the second spherical aberration correcting section 343 which is a member similar to the spherical aberration correcting section provided in the conventional reproducing device.

<Process of Reproducing Device>

Figure 11:
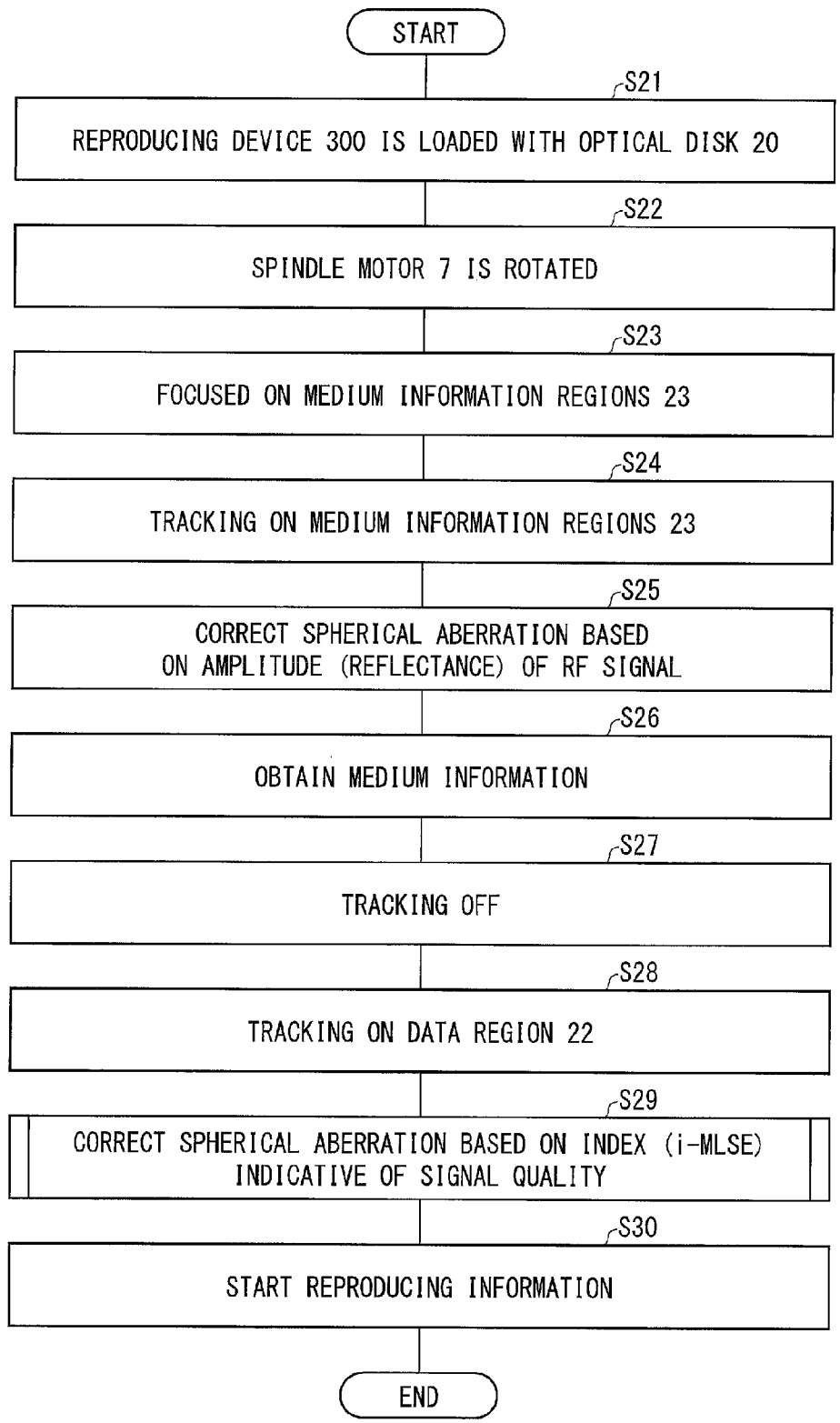
FIG. 11 is a view showing an example flow of how a reproduction operation is carried out, with respect to an optical disk, in the reproducing device in accordance with Embodiment 3 of the present invention.

FIG. 11 is a flow chart showing an example flow of how a reproduction operation is carried out (control method and reproduction method), with respect to the optical disk 20, in the reproducing device 300.

First, the reproducing device 300 is loaded with the optical disk 20 (process S21). The control section 34 of the reproducing device 300 recognizes, via a sensor (not illustrated) provided in the control section 34, that it has been loaded with the optical disk 20.

Subsequently, the control section 34 controls a spindle motor 7 to rotate (process S22). This causes the optical disk 20 to be driven and rotated under, for example, an operating condition in which, for example, a linear velocity is constant or a number of revolutions is constant. The control section 34 carries out various settings with respect to the reproducing device 300 in accordance with initial setting values stored in a memory 15.

Subsequently, the control section 34 controls a focusing/tracking drive circuit 10 to focus the objective lens 660 on the optical disk 20 (process S23). The control section 34 then controls the focusing/tracking drive circuit 10 to carry out tracking of the objective lens 660 with respect to a given position in the medium information regions 23 (process S24).

The second spherical aberration correcting section 343 corrects a spherical aberration in accordance with an amplitude (reflectance) of an RF signal, i.e., by using a spherical aberration correcting value obtained when a value of the amplitude of the RF signal becomes maximum (process S25; second spherical aberration correcting step). In doing so, the control section 34 determines the spherical aberration correcting value obtained when the value of the amplitude of the RF signal becomes maximum by carrying out processes similar to the processes S11 through S16. That is, the control section 34 (i) detects values of amplitudes of RF signals which values correspond to respective spherical aberration correcting values and (ii) specifies a maximum value among all of the values of the amplitudes of RF signals thus detected.

After the second spherical aberration correcting section 343 has corrected the spherical aberration by using the spherical aberration correcting value obtained when the value of the amplitude of the RF signal becomes maximum, the control section 34 carries out a reproduction with respect to the medium information regions 23 so as to obtain the medium information recorded in the medium information regions 23 (process S26). The control section 34 stores, in the memory 15, the medium information thus obtained.

Subsequently, the control section 34 controls the focusing/tracking drive circuit 10 to release a state in which the tracking of the objective lens 660 is being carried out with respect to a given position (process S27).

The control section 34 carries out the various settings with respect to the reproducing device 300 by selecting the initial setting values of the optical disk 20 which initial setting values are stored in the memory 15. For example, the control section 34 analyzes medium identification information contained in obtained medium information so as to determine whether or not the optical disk 20 is a super-resolution medium or a conventional medium (non-super-resolution medium). Specifically, in a case where the control section 34 determines that the optical disk 20 is a super-resolution medium, it changes an output of a semiconductor laser 61 from reproduction power for the conventional medium to reproduction power for the super-resolution reproduction. The control section 34 then controls the focusing/tracking drive circuit 10 to carry out tracking of the objective lens 660 with respect to a given position in the data region 22 (process S28).

The first spherical aberration correcting section 342 corrects a spherical aberration based on an index indicative of signal quality (i-MLSE), i.e., by using a spherical aberration correcting value obtained when an i-MLSE value, which has been evaluated by the i-MLSE detecting section 141, becomes minimum (process S29; first spherical aberration correcting step). Note that specific processes in the process S29 are similar to those of the processes S11 through S16.

After the first spherical aberration correcting section 342 has corrected the spherical aberration by using the spherical aberration correcting value obtained when the i-MLSE value becomes minimum, the control section 34 starts reproducing the information recorded in the data region 22 (process S30).

Note that, in the process S28, it is possible to change a reproduction speed (linear velocity) together with the reproduction power. This is because it is preferable to transfer, at a higher rate, information (e.g., information on a video image having high image quality) which (i) is to be utilized in the super-resolution medium and (ii) is recorded at a higher density. It is therefore preferable to transfer such information at a rate higher than that of the medium information regions 23. The linear velocity is more preferably a linear velocity (e.g., double-speed) at which information can be reproduced at a channel bit rate of n (n: an integer) times of a channel bit rate of the medium information regions 23. This is because it is possible to simplify an adjustment of the linear velocity.

<Effect>

According to the reproducing device 300, it is possible to suitably carry out a spherical aberration correcting with respect to each of the data region 22 (super-resolution region) and the medium information regions 23 (non-super-resolution regions). Accordingly, the reproducing device 300 brings about an effect of increasing reliability of reproduction of the optical disk 20 including the data region 22 and the medium information regions 23.

Note that, as with Embodiment 1, Embodiment 3 shows an example in which the i-MLSE is used as an index indicative of signal quality. Accordingly, the reproducing device 300 includes the i-MLSE detecting section 141.

Alternatively, as with Embodiment 2, it is possible to use an error rate as an index indicative of signal quality. In such a case, the reproducing device 300 can be configured to include the error rate detecting section 241, instead of the i-MLSE detecting section 141.

Embodiment 4

Figure 12:
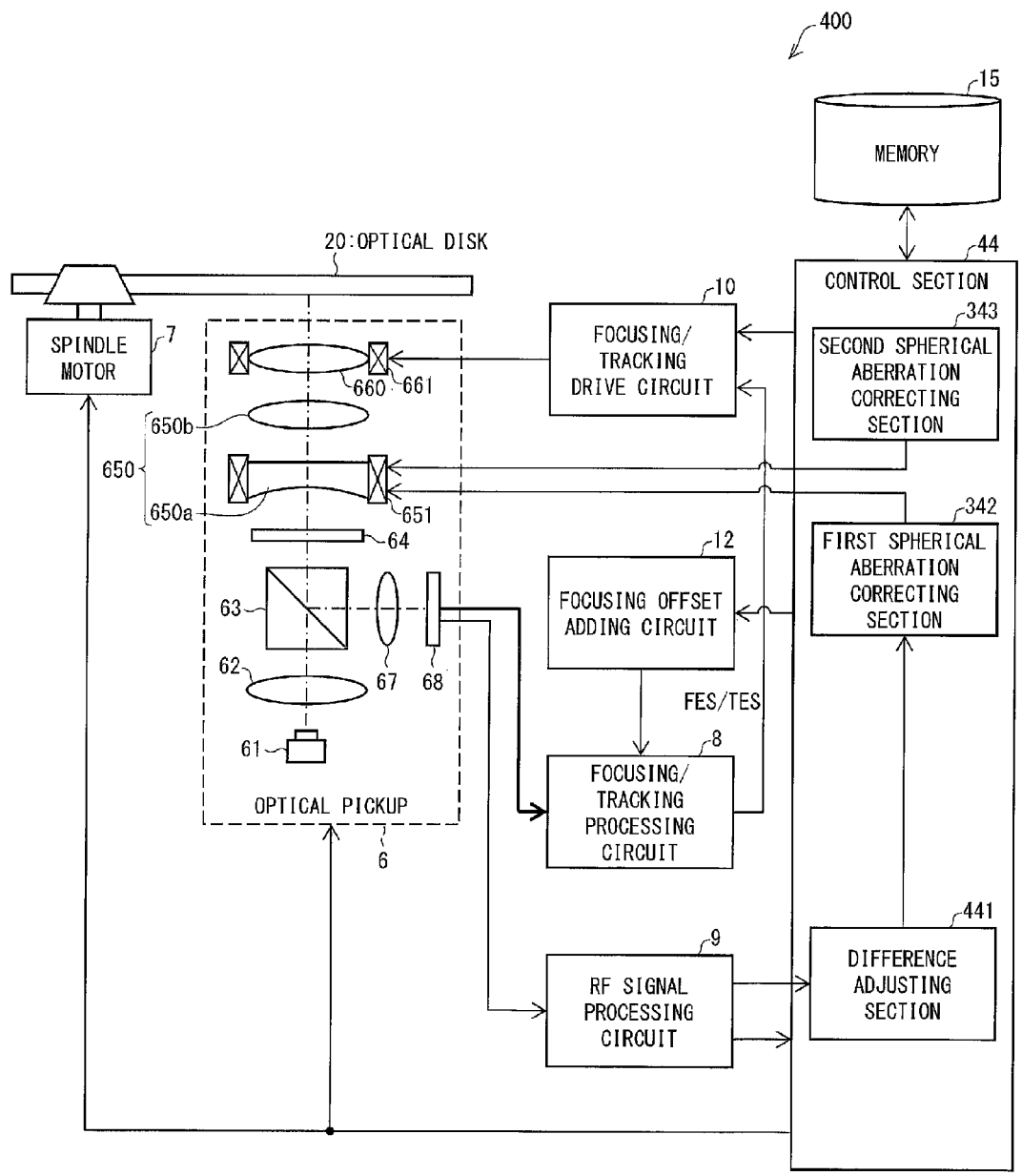
FIG. 12 is a functional block diagram schematically illustrating a configuration of a reproducing device in accordance with Embodiment 4 of the present invention.

The following description discusses still a further embodiment of the present invention with reference to FIG. 12. Note that, for convenience, members which have functions identical to those of Embodiments 1 through 3 are given identical reference numerals, and are not described repeatedly.

<Configuration of Reproducing Device>

FIG. 12 is a functional block diagram schematically illustrating a configuration of a reproducing device 400 of Embodiment 4. The reproducing device 400 of Embodiment 4 has a configuration obtained by replacing, with a control section 44, the control section 34 of the reproducing device 300 of Embodiment 3. Note that other members of the reproducing device 400 of Embodiment 4 are identical to those of the reproducing device 300 of Embodiment 3. Such members are thus given identical reference numerals, and are not described repeatedly. As with Embodiment 3, an optical disk to be reproduced by the reproducing device 400 is the optical disk 20.

The control section 44 includes a difference adjusting section 441, a first spherical aberration correcting section 342, and a second spherical aberration correcting section 343. The control section 44 of Embodiment 4 has a configuration obtained by replacing the i-MLSE detecting section 141 (or the error rate detecting section 241) with the difference adjusting section 441.

An RF signal processing circuit 9 supplies a reproduction signal to the difference adjusting section 441. The difference adjusting section 441 extracts, from the reproduction signal, manufacturer information (information for specifying a manufacturer of the optical disk 20) contained in the medium identification information. Note that the medium identification information is recorded in the medium information regions 23 of the optical disk 20. In order to reproduce the medium information regions 23, the control section 44 (i) determines a spherical aberration correcting value obtained when a value of an amplitude of an RF signal becomes maximum and (ii) supplies the spherical aberration correcting value to the second spherical aberration correcting section 343.

The difference adjusting section 441 specifies a spherical aberration correcting value (e.g., a spherical aberration correcting value which is recommended by the manufacturer so that best signal quality is obtained during reproducing the data region 22) based on manufacturer information. The manufacturer information can be information containing a spherical aberration correcting value recommended by the manufacturer. Alternatively, the manufacturer information can be mere information by use of which the manufacturer can be specified.

The following description assumes that (i) R1 represents a spherical aberration correcting value (e.g., a spherical aberration correcting value recommended by each manufacturer of the optical disk 20) (i.e., first spherical aberration correcting value) specified based on the manufacturer information and (ii) R2 indicates a spherical aberration correcting value (i.e., second spherical aberration correcting value) obtained when an amplitude of an RF signal becomes maximum, which R1 and R2 are specified by each of the plurality of manufacturers of the optical disk 20. The values R1 and R2 are stored in the memory 15 so as to be associated with each of manufacturer identifiers indicative of the respective plurality of manufacturers. The control section 44 controls the spherical aberration correcting value to be changed so that the amplitude of the RF signal becomes maximum. Note that it is herein assumed that RP indicates a current spherical aberration correcting value which is set by the control section 44.

The plurality of manufacturers of the optical disk 20 store in advance, in the memory 15, (i) R1, which has been specified by using the result of the evaluation of the quality of the reproduction signal indicative of the content recorded in the data region 22 and (ii) R2, which has been specified by using the amplitude of the reproduction signal indicative of the manufacturer information recorded in the medium information regions 23, so that R1 and R2 are associated with each manufacturer.

During reproduction of the data region 22, the difference adjusting section 441 calculates, by using the values R1 and R2, a difference $\Delta R$ between the spherical aberration correcting values, which $\Delta R$ is obtained by $\Delta R = R1 - R2$. The values R1 and R2 are stored in the memory 15 so as to be associated with each manufacturer (manufacturer identifier) indicated by the manufacturer information which has been read out from the medium information regions 23. The difference adjusting section 441 then supplies, to the first spherical aberration correcting section 342, a spherical aberration correcting value (a spherical aberration correcting value to be used during reproducing of the content) R, which is obtained by $R = RP + \Delta R$, i.e., by adding the difference $\Delta R$ to the current spherical aberration correcting value RP.

Note that the memory 15 can store therein, in advance, together with the values R1 and R2, difference information indicative of the difference ΔR so that the difference information is associated with each of the manufacturer identifiers. The values R1 and R2 are not necessarily stored in the memory 15. In such a case, the difference adjusting section 441 can (i) read out the difference ΔR from the memory 15 so as to calculate the spherical aberration correcting value R and (ii) supply, to the first spherical aberration correcting section 342, the spherical aberration correcting value R thus calculated.

<Effect>

In a case of producing an optical disk, manufacturing conditions, such as a cutting condition for forming pits, vary depending on a manufacturer of the optical disk. Accordingly, shapes of the pits of the optical disk may also vary depending on the manufacturer of the optical disk. A difference between (i) the spherical aberration correcting value obtained when the signal quality becomes best and (ii) the spherical aberration correcting value obtained when the amplitude of the RF signal becomes maximum, depends on the manufacturer of the optical disk.

According to the reproducing device 400, a difference, which is used during reproducing the data region 22, between (i) the spherical aberration correcting value (R1) which is specified based on the manufacturer information and (ii) the spherical aberration correcting value (R2) which is obtained when the amplitude of the RF signal becomes maximum, is specified in advance as the difference ΔR for each manufacturer of the optical disk.

Upon receipt of the spherical aberration correcting value R=RP+ΔR from the difference adjusting section 441, the first spherical aberration correcting section 342 corrects a spherical aberration caused during reproducing the data region 22. This allows the reproducing device 400 to reproduce the data region 22 by using a suitable spherical aberration correcting value varied depending on each manufacturer of the optical disk.

R1 is, for example, a representative value of spherical aberration correcting values recommended by each manufacturer of an optical disk. Accordingly, even in a case where an optical disk is manufactured by a same manufacturer, a spherical aberration correcting value which is most suitable for reproducing a data region 22 of the optical disk is sometimes not coincide with the above R1 due to a manufacturing tolerance of the optical disk and the like.

The reproducing device 400 (i) specifies, during reproducing of the medium information regions 23, the spherical aberration correcting value RP with respect to the optical disk 20 and then (ii) reproduces the data region 22 by using the spherical aberration correcting value R=RP+ΔR=R1+(PR−R2). Accordingly, the spherical aberration correcting value R to be used in the reproducing device 400 (i) has individually been set for the optical disk 20 and (ii) is a spherical aberration correcting value more suitable for reproducing the data region 22, as compared with the representative value R1.

The reproducing device 400 obtains manufacturer information so as to determine a spherical aberration correcting value to be used during reproducing the data region 22, instead of detecting an i-MLSE (or an error rate of address information) based on which signal quality is evaluated. This eliminates the necessity of including the i-MLSE detecting section 141 (or the error rate detecting section 241) in the reproducing device 400. As such, it is only necessary to include the difference adjusting section 441 which has a function simpler than the i-MLSE detecting section 141 (or the error rate detecting section 241).

This allows the reproducing device 400 of Embodiment 4 to bring about an effect of providing a lower-cost reproducing device, as compared with the reproducing devices of Embodiments 1 through 3.

Embodiment 4 discusses an example case where the spherical aberration correcting value, recommended by the manufacturer of the optical disk 20, is used as the value R1 stored in the memory 15. Note, however, that it is also assumed that there exists a manufacturer that does not provide a recommended value for the spherical aberration correcting value. In this case, it is preferable for a user to (i) specify a value R1 in advance and (ii) store, in the memory 15, the value R1 so that the value R1 is associated with the each of the manufacturer identifiers.

For example, in a case of using the reproducing device 300 of Embodiment 3, a spherical aberration correcting value, which is obtained when the i-MLSE value becomes minimum, is specified as a spherical aberration correcting value suitable for reproducing the data region 22. A user only needs to store, in the memory 15 of the reproducing device 400, the spherical aberration correcting value as the value R1.

This allows the reproducing device 400 to reproduce the optical disk 20, even in a case where the manufacturer does not provide the recommended value for the spherical aberration correcting value.

Embodiment 5

The following description discusses yet another embodiment of the present invention with reference to FIGS. 13 through 16. Note that, for convenience, members which have functions identical to those of Embodiments 1 through 4 are given identical reference numerals, and are not described repeatedly.

<Configuration of Optical Disk>

Figure 13:
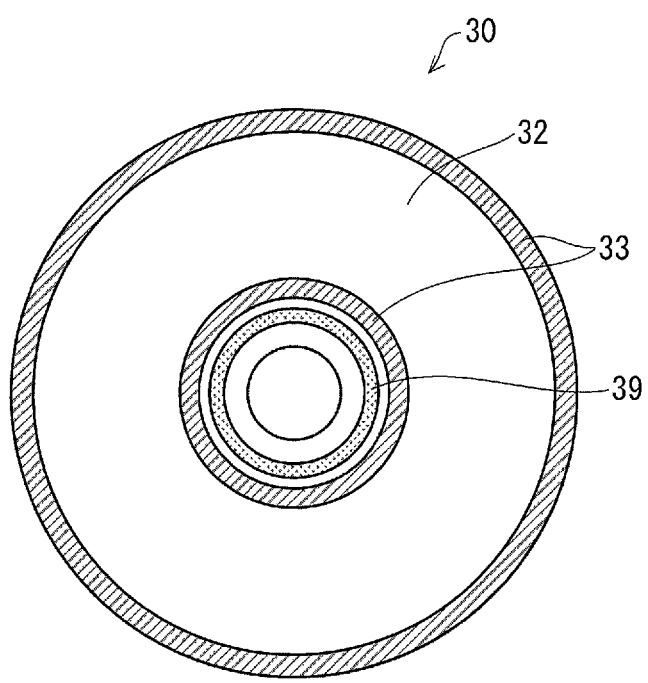
FIG. 13 is a perspective view illustrating an external appearance of an optical disk in accordance with Embodiment 5 of the present invention.
Figure 14:
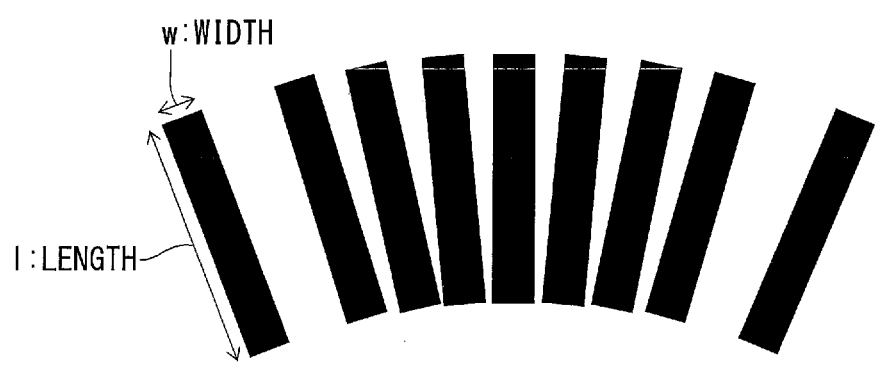
FIG. 14 is a view schematically illustrating an example of stripes to be formed in a BCA (Burst Cutting Area) recording region 39 of the optical disk illustrated in FIG. 13.

FIG. 13 is a perspective view illustrating an external appearance of an optical disk 30 to be reproduced by a reproducing device 500 of Embodiment 5. FIG. 14 is a view schematically illustrating an example of stripes to be formed in a BCA (Burst Cutting Area) recording region 39 of the optical disk 30 illustrated in FIG. 13.

The optical disk 30 has the BCA recording region 39, a medium information region 33, a data region 32, a medium information region 33 in this order from an inner circumferential side of the optical disk 30. The data region 32 and the medium information regions 33 have configurations identical to those of the data region 22 and the medium information regions 23, respectively, and are not described repeatedly. That is, the optical disk 30 differs from the optical disk 20 of Embodiment 3 in that the optical disk 30 has the BCA recording region 39 on an innermost circumferential side of the optical disk 30.

As illustrated in FIG. 13, the BCA recording region 39 is a region in which information (i.e., equivalent to the information regarding the optical disk 20 of Embodiment 3) (medium information) regarding the optical disk 30 is recorded, and the information includes medium identification information. The medium information is recorded in the following manner. That is, an information recording layer is irradiated with pulse laser light emitted from a YAG (Yttrium Aluminum Garnet) laser or the like. This causes stripes (barcodes) to be formed, each having (i) a width w of approximately 10 μm and (ii) a length l of approximately several hundreds of μm (see FIG. 14). That is, in the BCA recording region 39, the medium identification information is recorded in a stripe shape.

The stripes formed in the BCA recording region 39 are thus each larger than, for example, a pit having a length of approximately several hundreds of nm. This allows the reproducing device 500 to reproduce the medium information without carrying out tracking, even in a case where focusing on the BCA recording region 39 is slightly shifted. That is, while the reproducing device 500 is reproducing the medium information, the reproducing device 500 can reproduce the medium information without correcting (optimizing) a spherical aberration.

In a case where the optical disk 30 is made up of a plurality of layers, the BCA recording region 39 is provided on the information recording layer which is provided immediately above a substrate which is arranged farthest from a side from which reproduction light enters. Note, however, that the arrangement of the BCA recording region 39 is not limited to this.

The optical disk 30 only needs to be provided with at least the BCA recording region 39 and the data region 32.

<Configuration of Reproducing Device>

Figure 15:
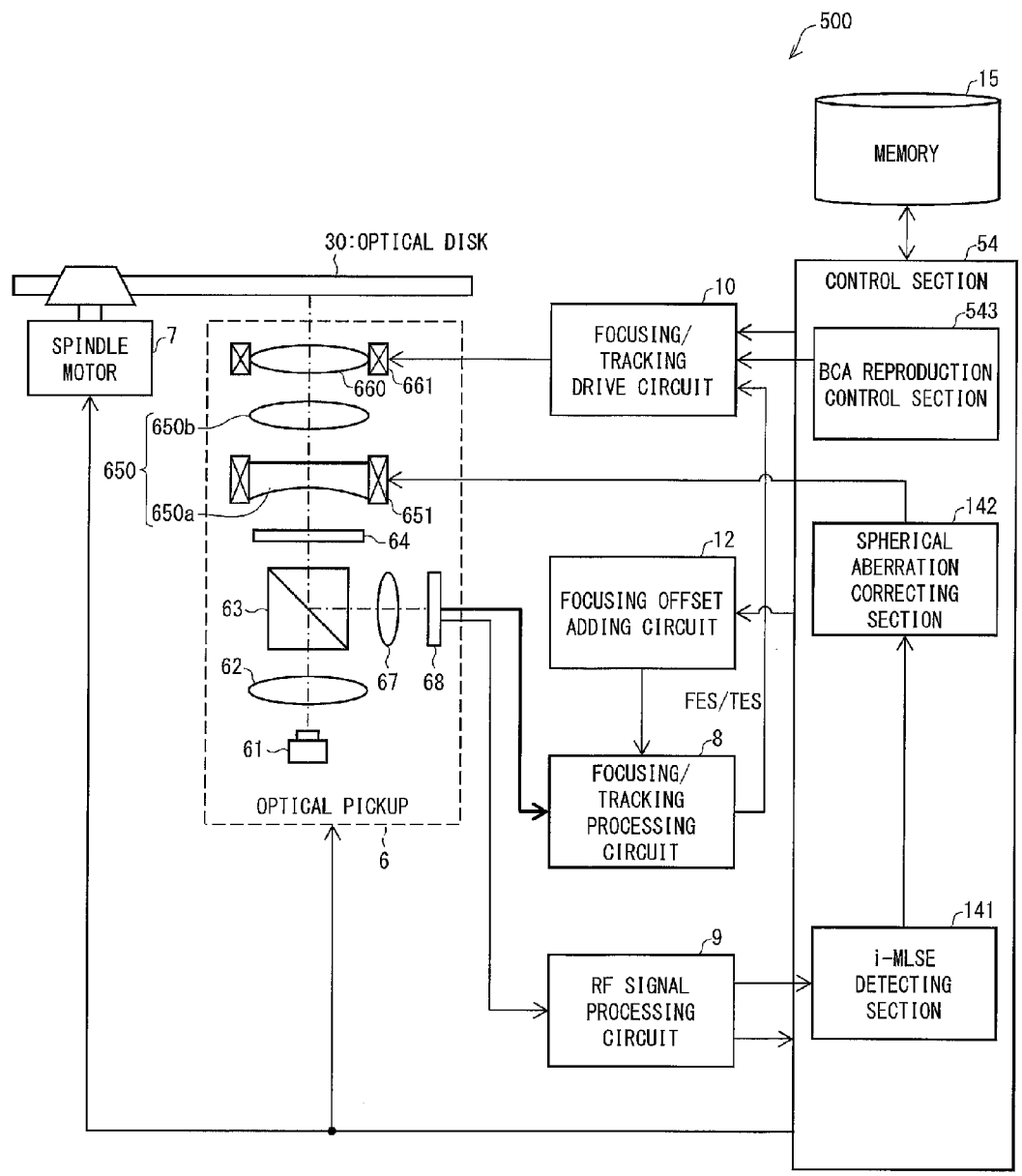
FIG. 15 is a functional block diagram schematically illustrating a configuration of a reproducing device of Embodiment 5.

FIG. 15 is a functional block diagram schematically illustrating a configuration of the reproducing device 500 of Embodiment 5. The reproducing device 500 of Embodiment 5 is a reproducing device for reproducing the optical disk 30. The reproducing device 500 of Embodiment 5 has a configuration obtained by replacing, with a control section 54, the control section 14 of the reproducing device 100 of Embodiment 1. Note that other members of the reproducing device 500 of Embodiment 5 are identical to those of the reproducing device 100 of Embodiment 1. Such members are thus given identical reference numerals, and are not described repeatedly.

The control section 54 includes an i-MLSE detecting section 141, a spherical aberration correcting section 142, and a BCA reproduction control section 543. The control section 54 of Embodiment 5 has a configuration obtained by adding the BCA reproduction control section 543 to the control section 14 of Embodiment 1.

Note that the spherical aberration correcting section 142 of Embodiment 5 has a function similar to that of the first spherical aberration correcting section 342 in which, during reproduction of content recorded in the data region 22, a spherical aberration is corrected by using a result of evaluated quality of a reproduction signal indicative of the content. Note also that, in a case where the medium information recorded in the BCA recording region 39 is reproduced, the spherical aberration correcting section 142 corrects a spherical aberration by using an initial value of a spherical aberration correcting value. That is, the spherical aberration to be corrected during reproduction of the medium information is not corrected based on an amplitude of an RF signal.

The BCA reproduction control section 543 controls a focusing/tracking drive circuit 10 to cause each section of an optical pickup 6 to carry out an operation for reproducing the medium information recorded in the BCA recording region 39.

<Process of Reproducing Device>

FIG. 16 is a flow chart showing an example flow of how a reproduction operation is carried out (control method and reproduction method), with respect to the optical disk 30, in the reproducing device 500.

First, the reproducing device 500 is loaded with the optical disk 30 (process S41). The control section 54 of the reproducing device 500 recognizes, by use of a sensor (not illustrated) provided in the control section 54, that it has been loaded with the optical disk 30.

Subsequently, the control section 54 controls a spindle motor 7 to rotate (process S42). This causes the optical disk 30 to be driven and rotated under, for example, an operating condition in which, for example, a linear velocity is constant or a number of revolutions is constant.

Subsequently, the BCA reproduction control section 543 controls the focusing/tracking drive circuit 10 to move the optical pickup 6 to a given position in the BCA recording region 39. The BCA reproduction control section 543 then controls an objective lens 660 to be focused on the BCA recording region 39 (process S43).

After the spherical aberration correcting section 142 has corrected the spherical aberration by using an initial value of a spherical aberration correcting value stored in a memory 15, the BCA reproduction control section 543 obtains medium information recorded in the BCA recording region 39 (process S44). Note that, in a case where the spherical aberration correcting value has been already set to the initial value, the BCA reproduction control section 543 obtains the medium information, instead of correcting the spherical aberration. The control section 54 stores, in the memory 15, the medium information thus obtained.

Note that, as has been described, no tracking is required during obtaining the medium information from the BCA recording region 39. Accordingly, prior to the process S44, no tracking is carried out with respect to the BCA recording region 39.

By using the medium information stored in the memory 15, the control section 54 selects initial setting values of the optical disk 30 so as to carry out various settings with respect to the reproducing device 500, which initial setting values are stored in the memory 15. For example, as has been described in Embodiment 3, the control section 54 (i) determines whether or not the optical disk 30 is a super-resolution medium and (ii) changes (a) an output of a semiconductor laser 61 and (b) a reproduction speed (linear velocity). The control section 54 then controls the focusing/tracking drive circuit 10 to carry out tracking of the objective lens 660 with respect to a given position in the data region 32 (process S45).

The spherical aberration correcting section 142 corrects a spherical aberration based on an index indicative of signal quality (i-MLSE), i.e., by using a spherical aberration correcting value obtained when the i-MLSE value becomes minimum (process S46). Note that a specific process flow of the process S46 is similar to those of the processes S11 through S16.

After the control section 54 controls the spherical aberration correcting section 142 to correct the spherical aberration by using the spherical aberration correcting value obtained when the i-MLSE value becomes minimum, the control section 54 starts reproducing information recorded in the data region 32 (process S47).

<Effect>

With the reproducing device 500, it is possible to reproduce the optical disk 30, which has the BCA recording region 39 in addition to the data region 32 (super-resolution region).

The reproducing device 500 can reproduce the medium information recorded in the BCA recording region 39, without requiring to (i) carry out tracking with respect to the BCA recording region 39 and (ii) optimize the spherical aberration correcting so as to carry out reproducing of the BCA recording region 39.

The reproducing device 500 of Embodiment 5 can bring about an effect of starting reproduction of the optical disk 30 in a time period shorter than a time period which the reproducing device 300 of Embodiment 3 needs in order to start reproduction of the optical disk 20.

[Software Implementation Example]

Control blocks of the reproducing devices 100 through 500 (particularly, the i-MLSE correcting section 141, the spherical aberration correcting section 142, the error rate detecting section 241, the first spherical aberration correcting section 342, the second spherical aberration correcting section 343, the difference adjusting section 441, and the BCA reproduction control section 543) can be realized by a logic circuit (hardware) provided in an integrated circuit (IC chip) or the like or can be alternatively realized by software as executed by a CPU (Central Processing Unit).

In the latter case, the reproducing devices 100 through 500 each include a CPU that executes instructions of a program that is software realizing the foregoing functions; ROM (Read Only Memory) or a storage device (each referred to as "storage medium") in which the program and various kinds of data are stored so as to be readable by a computer (or a CPU); and RAM (Random Access Memory) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Main Points]

A reproducing device (100, 200, 300, 500) of a first aspect of the present application is a reproducing device capable of reproducing content from an optical information recording medium (optical disk 1) in which the content is recorded in a form of a pit group including one or more pits shorter than an optical system resolution limit of the reproducing device, including: an irradiation section (optical pickup 6) for irradiating the optical information recording medium with reproduction light; a conversion section (RF signal processing circuit 9) for converting, into reproduction signal (RF signal) indicative of the content, light which reflected off the optical information recording medium; a signal quality evaluating section (i-MLSE detecting section 141, error rate detecting section 241) for evaluating quality of the reproduction signal converted by the conversion section; and a spherical aberration correcting section (142) for correcting a spherical aberration caused by the irradiation section, by using a result of evaluation of the quality of the reproduction signal which quality has been evaluated by the signal quality evaluating section.

In a case where a reproducing device reproduces an optical information recording medium (i.e., a non-super-resolution medium (i) in which none of pits is shorter than an optical system resolution limit of the reproducing device and (ii) which cannot be reproduced by a super-resolution technique) in which information is recorded in a form of a pit group including pits each having a length not less than the optical system resolution limit of the reproducing device, a spherical aberration is corrected based on an amplitude of an RF signal (see Patent Literature 1, for example). That is, a spherical aberration correcting value for correcting the spherical aberration is determined so that the amplitude of the RF signal becomes maximum, and the spherical aberration is corrected by using the spherical aberration correcting value thus determined. According to the non-super-resolution medium, by correcting the spherical aberration so that the amplitude of the RF signal becomes maximum, it is possible to reproduce the information while a signal characteristic is high.

Examples of a reason that the amplitude of the RF signal is used to correct the spherical aberration during reproduction of the non-super-resolution medium encompass the following reason. That is, it is common knowledge for a person skilled in the art that "a signal characteristic of a reproduction signal is proportional to an amount of return light (reflected light amount, return light amount) which (i) is caused by reflectance of an optical information recording medium (non-super-resolution medium) and (ii) is received by a reproducing device". The reflectance refers to a ratio, to reproduction light, of light which reflected off the optical information recording medium irradiated with the reproduction light.

A function (member, section) for calculating the amplitude of the RF signal is an essential configuration for the reproducing device to reproduce information recorded on an optical information recording medium made up of a plurality of layers. That is, another reason for using the method described above is that a production cost increases in a case where a new function different from the function of calculating the amplitude of the RF signal is provided in the reproducing device so as to correct the spherical aberration.

Note, however, that, as described with reference to FIG. 6, the inventors of the present application found that, according to an optical information recording medium (i.e., a super-resolution medium reproducible by the super-resolution technique) in which content is recorded in a form of a pit group including one or more pits shorter than an optical system resolution limit of a reproducing device, a signal characteristic may be low, depending on shapes of pits provided on the super-resolution medium, even in a case where an amplitude of an RF signal becomes maximum. That is, it becomes therefore clear that, in a case where information recorded on a super-resolution medium is reproduced by a reproducing device which corrects a spherical aberration based on a light intensity of light which reflected off the super-resolution medium and received by the reproducing device, reproduction quality may deteriorate depending on the super-resolution medium.

In view of the circumstances, according to the aspect of the present invention, the signal quality evaluating section evaluates the quality of the reproduction signal based on the light which reflected off the optical information recording medium (super-resolution medium) irradiated with the reproduction light from the irradiation section. The spherical aberration correcting section corrects the spherical aberration caused by the irradiation section, by using the result of the evaluation of the quality of the reproduction signal which quality has been evaluated by the signal quality evaluating section. With the arrangement, the spherical aberration correcting section corrects the spherical aberration by using the result of the evaluation of the quality of the reproduction signal, instead of using an amplitude of an RF signal.

Accordingly, during reproduction of the super-resolution medium, it is possible to correct the spherical aberration while a signal characteristic is sufficiently high. This prevents a case where the spherical aberration is corrected while signal quality is low, which case occurs when the spherical aberration is corrected based on the amplitude of the RF signal.

With the aspect of the present invention, unlike a case where the spherical aberration is corrected by use of the amplitude of the RF signal, it is therefore possible to accurately reproduce information, such as content, recorded on unspecified number of super-resolution media.

A reproducing device (100, 200, 300, 500) of a second aspect of the present application is a reproducing device capable of reproducing content by irradiating, via an objective lens (600) having a numerical aperture of 0.85, an optical information recording medium with reproduction light having a wavelength of 405 nm, the optical information recording medium (optical disk 1) including (a) a light transmitting layer (4) having a surface which the reproduction light enters, (b) an information recording layer (3) which the reproduction light reflects off so that information is reproduced, and (c) a substrate (2) on which a pit group is provided in a scanning direction, the pit group including one or more pits shorter than 119 nm which is an optical system resolution limit of the reproducing device, the light transmitting layer, the information recording layer, and the substrate being provided in this order from a side from which the reproduction light enters, the content being recorded in the information recording layer by use of the pit group, including: an irradiation section (optical pickup 6) for irradiating the optical information recording medium with reproduction light; a conversion section (RF signal processing circuit 9) for converting, into reproduction signal indicative of the content, light which reflected off the optical information recording medium; a signal quality evaluating section (i-MLSE detecting section 141, error rate detecting section 241) for evaluating quality of the reproduction signal converted by the conversion section; and a spherical aberration correcting section (spherical aberration correcting section 142) for correcting a spherical aberration caused by the irradiation section, by using a result of evaluation of the quality of the reproduction signal which quality has been evaluated by the signal quality evaluating section.

As described above, according to the non-super-resolution medium, by correcting the spherical aberration based on the amplitude of the RF signal, it is possible to reproduce the information while the signal characteristic is high. Meanwhile, however, according to the super-resolution medium, it may not be possible to reproduce the information while the signal characteristic is high.

On the optical information recording medium which is to be reproduced by the reproducing device of the aspect of the present invention, (i) the light transmitting layer, the information recording layer, and the substrate are provided and (ii) the content is recorded in the information recording layer by providing, on the substrate, the pit group including one or more pits shorter than 119 nm, which is the optical system resolution limit of the reproducing device. The reproducing device of the aspect of the present invention irradiates, via the objective lens having a numerical aperture of 0.85, the reproduction light having a wavelength of 405 nm.

That is, the optical information recording medium to be reproduced by the reproducing device of the aspect of the present invention is a super-resolution medium and the reproducing device is capable of reproducing content recorded on the super-resolution medium.

According to the aspect of the present invention, the signal quality evaluating section evaluates the quality of the reproduction signal based on the light which reflected off the optical information recording medium (super-resolution medium) irradiated with the reproduction light irradiated from the irradiation section. The spherical aberration correcting section corrects, by using the result of the evaluation of the quality of the reproduction signal which quality has been evaluated by the signal quality evaluating section, the spherical aberration caused by the irradiation section.

As with the first aspect, unlike a case where the spherical aberration is corrected by use of the amplitude of the RF signal, it is therefore possible to accurately reproduce information, such as content, recorded on unspecified number of super-resolution media.

In a third aspect of the present invention, a reproducing device is preferably arranged such that, in the first or second aspect of the present invention, the signal quality evaluating section is (i) an i-MLSE (Integrated-Maximum Likelihood Sequence Estimation) detecting section (141) for (a) detecting an i-MLSE which is an evaluation index for evaluating a signal characteristic of the reproduction signal and (b) evaluating the quality of the reproduction signal or (ii) an address information error detecting section (error rate detecting section 241) for (a) detecting an error rate of address information contained in the reproduction signal and (b) evaluating the quality of the reproduction signal.

With the arrangement, the signal quality evaluating section is the i-MLSE detecting section or the address information error detecting section.

In a case where the signal quality evaluating section is the i-MLSE detecting section, the i-MLSE can be used as the result of the evaluation of the quality of the reproduction signal. Accordingly, during reproduction of a super-resolution medium, it is possible to correct a spherical aberration while a signal characteristic is sufficiently high.

Meanwhile, in a case where the signal quality evaluating section is the address information error detecting section, the error rate of address information can be used as the result of the evaluation of the quality of the reproduction signal.

The address information error detecting section is normally provided in a reproduction device by which a super-resolution medium is to be reproduced. Accordingly, without providing, in the reproducing device, a new function (member, section) for evaluating quality of a reproduction signal, it is possible to correct the spherical aberration during reproduction of the super-resolution medium, by using the error rate of the address information which error rate has been detected by the address information error detecting section, while a signal characteristic is sufficiently high.

Note that, as described above, the inventors of the present application found that the signal characteristic may be low, depending on the shapes of the pits provided on the super-resolution medium, even in a case where the amplitude of the RF signal becomes maximum. It is therefore not assumed that while the super-resolution medium is reproduced by a conventional reproducing device by which a super-resolution medium is to be reproduced, a spherical aberration is corrected by using, as a result of evaluation of quality of a reproduction signal, an error rate of address information detected by an address information error detecting section. The inventors of the present application found that such a method is used to correct the spherical aberration.

A reproducing device (300, 400) of a fourth aspect of the present invention is a reproducing device capable of reproducing content from an optical information recording medium (optical disk 20) having (i) a first region (data region 22) in which the content is recorded in a form of a first pit group including one or more pits shorter than an optical system resolution limit of the reproducing device and (ii) a second region (medium information region 23) in which medium identification information for distinguishing a type of the optical information recording medium is recorded in a form of a second pit group including pits each having a length not less than the optical system resolution limit of the reproducing device, the reproducing device including: a first spherical aberration correcting section (342) for, during reproduction of the content recorded in the first region, carrying out a process of correcting, by using a result of evaluation of quality of a reproduction signal indicative of the content, a spherical aberration caused by an irradiation section (optical pickup 6) for irradiating the optical information recording medium with reproduction light; and a second spherical aberration correcting section (343) for, during reproduction of the medium identification information recorded in the second region, correcting, by carrying out a process different from the process to be carried out by the first spherical aberration correcting section, the spherical aberration caused by the irradiation section.

As described above, according to the non-super-resolution medium, by correcting the spherical aberration based on the amplitude of the RF signal, it is possible to reproduce the information while the signal characteristic is high. Meanwhile, however, according to the super-resolution medium, it may not be possible to reproduce the information while the signal characteristic is high. That is, as described above, during reproduction of the super-resolution medium, the spherical aberration is corrected based on the result of the evaluation of the quality of the reproduction signal.

The optical information recording medium which is to be reproduced by the reproducing device of the aspect of the present invention has the first region and the second region. The first region is a region in which the content is recorded in a form of first pit group including one or more pits shorter than the optical system resolution limit of the reproducing device. That is, the first region is a super-resolution region in which information is reproducible by the super-resolution technique. Meanwhile, the second region is a region in which the medium identification information for distinguishing a type of the optical information recording medium is recorded in a form of second pit group including pits each having a length not less than the optical system resolution limit of the reproducing device. That is, the second region is a non-super-resolution region in which information is unreproducible by the super-resolution technique.

According to the reproducing device of the aspect of the present invention, during reproduction of the content recorded in the first region, which is the super-resolution region, the first spherical aberration correcting section carries out the process of correcting the spherical aberration by using the result of the evaluation of the quality of the reproduction signal. Meanwhile, during reproduction of the medium identification information recorded in the second region, which is the non-super-resolution region, the second spherical aberration correcting section corrects the spherical aberration by carrying out the process different from the process to be carried out by the first spherical aberration correcting section. Examples of the process different from the process to be carried out by the first spherical aberration correcting section encompass correction of the spherical aberration by using the amplitude of the RF signal.

This makes it possible to reproduce, while a signal characteristic is high, each of (i) the content recorded in the first region (super-resolution region) and (ii) the medium identification information recorded in the second region (non-super-resolution region). According to the aspect of the present invention, it is therefore possible to accurately reproduce information, such as content, recorded in unspecified number of super-resolution regions of a super-resolution medium having both of a super-resolution region and a non-super-resolution region.

In a fifth aspect of the present invention, a reproducing device (300) is preferably arranged such that, in the fourth aspect of the present invention, The reproducing device as set forth in claim 4, further including a signal quality evaluating section (i-MLSE detecting section 141, error rate detecting section 142) for evaluating quality of a reproduction signal indicative of the content recorded in the first region, the first spherical aberration correcting section correcting, by using a result of evaluation of the quality of the reproduction signal which quality has been evaluated by the signal quality evaluating section, the spherical aberration caused by the irradiation section, the signal quality evaluating section being (i) an i-MLSE (Integrated-Maximum Likelihood Sequence Estimation) detecting section (141) for (a) detecting an i-MLSE which is an evaluation index for evaluating a signal characteristic of the reproduction signal and (b) evaluating the quality of the reproduction signal or (ii) an address information error detecting section (error rate detecting section 142) for (a) detecting an error rate of address information contained in the reproduction signal and (b) evaluating the quality of the reproduction signal.

With the arrangement, the signal quality evaluating section is the i-MLSE detecting section or the address information error detecting section.

In a case where the signal quality evaluating section is the i-MLSE detecting section, the i-MLSE can be used as the result of the evaluation of the quality of the reproduction signal. Accordingly, during reproduction of the first region (super-resolution region), it is possible to correct a spherical aberration while a signal characteristic is sufficiently high.

Meanwhile, in a case where the signal quality evaluating section is the address information error detecting section, the error rate of address information can be used as the result of the evaluation of the quality of the reproduction signal.

As described in the third aspect, without providing, in the reproducing device, a new function (member, section) for evaluating quality of a reproduction signal, it is possible to correct the spherical aberration during reproduction of the super-resolution region, by using the error rate of the address information which error rate has been detected by the address information error detecting section, while a signal characteristic is sufficiently high.

A reproducing device (400) of a sixth aspect of the present invention is a reproducing device capable of reproducing content from an optical information recording medium (optical disk 20) having (i) a first region (data region 22) in which the content is recorded in a form of a first pit group including one or more pits shorter than an optical system resolution limit of the reproducing device and (ii) a second region (medium information region 23) in which manufacturer information for specifying a manufacturer of the optical information recording medium is recorded in a form of a second pit group including pits each having a length not less than the optical system resolution limit of the reproducing device, a plurality of manufacturers by each of which the optical information recording medium is manufactured storing in advance, in the reproducing device, a first spherical aberration correcting value (spherical aberration correcting value R1) and a second spherical aberration correcting value (spherical aberration correcting value R2) so that the first spherical aberration correcting value and the second spherical aberration correcting value are associated with each of the plurality of manufacturers, the first spherical aberration correcting value being specified by using a result of evaluation of quality of a reproduction signal indicative of the content recorded in the first region, the second spherical aberration correcting value (spherical aberration correcting value R2) being specified by using an amplitude of a reproduction signal indicative of the manufacturer information recorded in the second region, the reproducing device including: (i) a difference adjusting section (441) calculating a spherical aberration correcting value (R) to be used during reproduction of the content, the spherical aberration correcting value (R) being calculated by adding, to a spherical aberration correcting value (RP) obtained when the manufacturer information has been read out from the second region, a difference (ΔR) between the first spherical aberration correcting value and the second spherical aberration correcting value which are associated with a manufacturer indicated by the manufacturer information which has been read out from the second region; and (ii) a first spherical aberration correcting section (342) for, during reproduction of the content recorded in the first region, correcting, by using a spherical aberration correcting value to be used during reproduction of the content, a spherical aberration caused by an irradiation section (optical pickup 6) for irradiating the optical information recording medium with reproduction light.

Accordingly, a difference between (i) a spherical aberration correcting value obtained when signal quality of a reproduction signal becomes best during reproduction of the first region and (ii) a spherical aberration correcting value obtained when an amplitude of an RF signal becomes maximum during reproduction of the second region depends on a manufacturer that manufactures the optical information recording medium.

With the arrangement, the reproducing device stores therein in advance the first spherical aberration correcting value and the second spherical aberration correcting value which are associated with each of the plurality of manufacturers. The difference adjusting section calculates, in the following manner, the spherical aberration correcting value to be used during reproduction of the content. That is, the difference adjusting section calculates the spherical aberration correcting value by adding, to the spherical aberration correcting value obtained when the manufacturer information has been read out from the second region, the difference between the first spherical aberration correcting value and the second spherical aberration correcting value which have been associated with a manufacturer indicated by the manufacturer information which has been read out from the optical information recording medium. During reproduction of the content, the first spherical aberration correcting section corrects the spherical aberration by using the spherical aberration correcting value to be used during reproduction of the content which spherical aberration correcting value has been calculated by the difference adjusting section.

Accordingly, during reproduction of the content, it is possible to correct the spherical aberration by merely providing the reproduction device with a difference adjusting section having a simpler function, without providing the reproduction device with a signal quality evaluating section (i-MLSE detecting section, error rate detecting section, etc.) for evaluating quality of a reproduction signal indicative of the content. According to the aspect of the present invention, it is therefore possible to accurately reproduce information, such as content, recorded in unspecified number of super-resolution regions of a super-resolution medium having both of a super-resolution region and a non-super-resolution region.

A reproducing device (400) of a seventh aspect of the present invention is a reproducing device capable of reproducing content from an optical information recording medium (optical disk 20) having (i) a first region (data region 22) in which the content is recorded in a form of a first pit group including one or more pits shorter than an optical system resolution limit of the reproducing device and (ii) a second region (medium information region 23) in which manufacturer information for specifying a manufacturer of the optical information recording medium is recorded in a form of second pit group including pits each having a length not less than the optical system resolution limit of the reproducing device, a plurality of manufacturers by each of which the optical information recording medium is manufactured storing in advance, in the reproducing device, difference information indicative of a difference (ΔR) between a first spherical aberration correcting value (spherical aberration correcting value R1) and a second spherical aberration correcting value (spherical aberration correcting value R2) so that the first spherical aberration correcting value and the second spherical aberration correcting value are associated with each of the plurality of manufacturers, the first spherical aberration correcting value being specified by using a result of evaluation of quality of a reproduction signal indicative of the content recorded in the first region, the second spherical aberration correcting value (spherical aberration correcting value R2) being specified by using an amplitude of a reproduction signal indicative of the manufacturer information recorded in the second region, the reproducing device including: (i) a difference adjusting section calculating a spherical aberration correcting value (R) to be used during reproduction of the content, the spherical aberration correcting value (R) being calculated by adding, to a spherical aberration correcting value (RP) obtained when the manufacturer information has been read out from the second region, the difference indicated by the difference information which is associated with a manufacturer indicated by the manufacturer information which has been read out from the second region; and (ii) a first spherical aberration correcting section (342) for, during reproduction of the content recorded in the first region, correcting, by using a spherical aberration correcting value to be used during reproduction of the content, a spherical aberration caused by an irradiation section (optical pickup 6) for irradiating the optical information recording medium with reproduction light.

With the arrangement, the reproducing device stores therein in advance the difference information indicative of the difference between the first spherical aberration correcting value and the second spherical aberration correcting value which are associated with each of the plurality of manufacturers. The difference adjusting section calculates, in the following manner, the spherical aberration correcting value to be used during reproduction of the content. That is, the difference adjusting section calculates the spherical aberration correcting value by adding, to the spherical aberration correcting value obtained when the manufacturer information has been read out from the second region, the difference indicated by the difference information which has been associated with a manufacturer indicated by the manufacturer information which has been read out from the optical information recording medium. During reproduction of the content, the first spherical aberration correcting section corrects the spherical aberration by using the spherical aberration correcting value to be used during reproduction of the content which spherical aberration correcting value has been calculated by the difference adjusting section.

Accordingly, during reproduction of the content, it is possible to correct the spherical aberration by merely providing the reproduction device with a difference adjusting section having a simpler function, without providing the reproduction device with a signal quality evaluating section (i-MLSE detecting section, error rate detecting section, etc.) for evaluating quality of a reproduction signal indicative of the content. According to the aspect of the present invention, it is therefore possible to accurately reproduce information, such as content, recorded in unspecified number of super-resolution regions of a super-resolution medium having both of a super-resolution region and a non-super-resolution region.

A reproducing device (500) of an eighth aspect of the present invention is a reproducing device capable of reproducing content from an optical information recording medium (optical disk 30) having (i) a first region (data region 22) in which the content is recorded in a form of a first pit group including one or more pits shorter than an optical system resolution limit of the reproducing device and (ii) a BCA (Burst Cutting Area) recording region (39) in which medium identification information for distinguishing a type of the optical information recording medium is recorded in a stripe shape, the reproducing device including: a BCA reproduction control section (543) for reproducing the medium identification information recorded in the BCA recording region; and a spherical aberration correcting section (spherical aberration correcting section 142, first spherical aberration correcting section 342) for, during reproduction of the content recorded in the first region, correcting, by using a result of evaluation of quality of a reproduction signal indicative of the content, a spherical aberration caused by an irradiation section (optical pickup 6) for irradiating the optical information recording medium with reproduction light.

With the arrangement, the optical information recording medium has the BCA recording region in which the medium identification information is recorded in the stripe shape. The BCA reproduction control section reproduces the medium identification information from the BCA recording region.

The medium identification information recorded in the BCA recording region is formed, for example, in the stripe shape which is larger than a pit having a length not less than the optical system resolution limit of the reproducing device. This allows the BCA reproduction control section to read out the medium identification information without carrying out processes such as (i) a process of correcting a spherical aberration and (ii) a tracking process, unlike a case where the medium identification information is formed by pits.

According to the aspect of the present invention, it is therefore unnecessary to carry out the processes in a case where the BCA reproduction control section reproduces the medium identification information, and it is only necessary for the spherical aberration correcting section to correct the spherical aberration during reproduction of the content recorded in the first region. This makes it possible to reduce a time period which is necessary to start reproduction of the information.

A reproducing method in accordance with a ninth aspect of the present invention is a method of controlling the reproducing device of the first or second aspect of the present invention, the reproducing method including the steps of: (a) irradiating the optical information recording medium with reproduction light; (b) converting, into reproduction signal indicative of the content, light which reflected off the optical information recording medium; (c) evaluating quality of the reproduction signal converted in the step (b); and (d) correcting a spherical aberration caused by the irradiation section, by using a result of evaluation of the quality of the reproduction signal which quality has been evaluated in the step (c).

With the arrangement, as with the first and second aspects, it is possible to accurately reproduce information, such as content, recorded on unspecified number of super-resolution media.

A reproducing method in accordance with a tenth aspect of the present invention is a method of controlling (a method of reproducing) the reproducing device of the fourth aspect of the present invention, the reproducing method including the steps of: (a) during reproduction of the content recorded in the first region, carrying out a process of correcting, by using a result of evaluation of quality of a reproduction signal indicative of the content, a spherical aberration caused by an irradiation section for irradiating the optical information recording medium with reproduction light; and (b) during reproduction of the medium identification information recorded in the second region, correcting, by carrying out a process different from the process to be carried out in the step (a), the spherical aberration caused by the irradiation section.

With the arrangement, it is possible to accurately reproduce information, such as content, recorded in unspecified number of super-resolution regions of a super-resolution medium having both of a first region (super-resolution region) and a second region (non-super-resolution region).

A reproducing device in accordance with an eleventh aspect of the present invention is a reproducing device capable of reproducing content from an optical information recording medium in which the content is recorded in a form of a pit group including one or more pits shorter than an optical system resolution limit of the reproducing device, the reproducing device including: a signal quality evaluating section for evaluating quality of a reproduction signal which (i) has been generated based on reproduction light with which the optical information recording medium has been irradiated and (ii) is indicative of the content; and a spherical aberration correcting section for correcting, by using a result of evaluation of the quality of the reproduction signal which quality has been evaluated by the signal quality evaluating section, a spherical aberration caused by an irradiation section for irradiating the optical information recording medium with reproduction light.

With the arrangement, as with the first aspect, it is possible to accurately reproduce information, such as content, recorded on unspecified number of super-resolution media.

The reproducing device in accordance with the foregoing aspects of the present invention may be realized by a computer. In this case, the present invention encompasses: a control program for the reproducing device which program causes a computer to operate as each section of the reproducing device so that the reproducing device can be realized by the computer; and a computer-readable storage medium storing therein the control program.

[Miscellaneous Descriptions]

Note that an aspect of the present invention can be described as below.

(1) An optical information recording medium reproducing device in accordance with an aspect of the present invention is a reproducing device for reproducing content to be used by a user, from a read-only optical information recording medium in which the content to be used by the user is recorded in a form of pit group including one or more pits shorter than an optical system resolution limit of a reproducing optical system of the corresponding reproducing device, the reproducing device including: an irradiation section for irradiating the read-only optical information recording medium with reproduction light; a conversion section for converting, into a signal, light which reflected off the read-only optical information recording medium and is obtained by the irradiation section; a signal quality evaluating section for evaluating quality of the signal obtained by the conversion section; and a signal quality-based spherical aberration correcting section for correcting a spherical aberration caused by the irradiation section, by use of the signal quality evaluating section.

(2) An optical information recording medium reproducing device in accordance with an aspect of the present invention is a reproducing device for reproducing content to be used by a user, by irradiating, via an objective lens having a numerical aperture of 0.85, an optical information recording medium with reproduction light having a wavelength of 405 nm, the optical information recording medium including (a) a light transmitting layer having a surface which the reproduction light enters, (b) an information recording layer, and (c) a substrate, the light transmitting layer, the information recording layer, and the substrate being provided in this order from a side from which the reproduction light enters, the content to be used by the user, being recorded in the information recording layer by use of a pre-pit group (i) which is provided on the substrate in a scanning direction of the reproducing device, the pre-pit group including one or more pre-pits shorter than 119 nm which is an optical system resolution limit of the reproducing device, the reproducing device including: an irradiation section for irradiating the read-only optical information recording medium with reproduction light; a conversion section for converting, into a signal, light which reflected with the optical information recording medium and is obtained by the irradiation section; a signal quality evaluating section for evaluating quality of the signal obtained by the conversion section; and a signal quality-based spherical aberration correcting section for correcting a spherical aberration caused by the irradiation section, by use of the signal quality evaluating section.

(3) In an aspect of the present invention, an optical information recording medium reproducing device can be arranged such that, in (1) or (2), the signal quality evaluating section is (i) an i-MLSE detecting section for detecting an i-MLSE from a reproduction signal or (ii) an address information error detecting section for (a) extracting only address information from a reproduction signal and (b) detecting an error rate of only the address information.

(4) An optical information recording medium reproducing device in accordance with an aspect of the present invention is a reproducing device for reproducing content to be used by a user, from an optical information recording medium having (i) a first region in which the content to be used by the user is recorded in a form of pit group including one or more pits shorter than an optical system resolution limit of a reproducing optical system of the corresponding reproducing device and (ii) a second region in which medium identification information for distinguishing a type of the optical information recording medium is recorded in a form of pit group including only pits longer than the optical system resolution limit of the reproducing optical system of the corresponding reproducing device, a first spherical aberration correcting section to be used during reproduction of the first region differing from a second spherical aberration correcting section to be used during reproduction of the second region.

(5) In an aspect of the present invention, an optical information recording medium reproducing device can be arranged such that, in (4), the first spherical aberration correcting section is (i) an i-MLSE detecting section for detecting an i-MLSE from a reproduction signal or (ii) an address information error detecting section for (a) extracting only address information from a reproduction signal and (b) detecting an error rate of only the address information.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is applicable to a super-resolution medium.

REFERENCE SIGNS LIST

1: Optical disk (optical information recording medium)
A: Optical disk (optical information recording medium)
B: Optical disk (optical information recording medium)
2: Substrate
3: Information recording layer
4: Light transmitting layer
6: Optical pickup (irradiation section)
9: RF signal processing circuit (conversion section)
20: Optical disk (optical information recording medium)
22: Data region (first region)
23: Medium information region (second region)
30: Optical disk (optical information recording medium)
100: Reproducing device
141: i-MLSE detecting section (signal quality evaluating section)
142: Spherical aberration correcting section
200: Reproducing device
241: Error rate detecting section (signal quality evaluating section, address information error detecting section)
300: Reproducing device
342: First spherical aberration correcting section
343: Second spherical aberration correcting section
660: Objective lens

The invention claimed is:
1. A reproducing device capable of reproducing content from an optical information recording medium in which the content is recorded in a form of a pit group including one or more pits shorter than an optical system resolution limit of the reproducing device, comprising:
an irradiation section for irradiating the optical information recording medium with reproduction light;
a conversion section for converting, into reproduction signal indicative of the content, light which reflected off the optical information recording medium;
a signal quality evaluating section for evaluating quality of the reproduction signal converted by the conversion section; and
a spherical aberration correcting section for correcting a spherical aberration caused by the irradiation section, by using a result of evaluation of the quality of the reproduction signal which quality has been evaluated by the signal quality evaluating section; wherein the signal quality evaluating section is an i-MLSE (Integrated-Maximum Likelihood Sequence Estimation) detecting section for (a) detecting an i-MLSE which is an evaluation index for evaluating a signal characteristic of the reproduction signal and (b) evaluating quality of the reproduction signal, the reproducing device being configured to (i) determine whether the optical information recording medium is a super-resolution medium or a conventional medium and (ii) in a case where the reproducing device has determined that the optical information recording medium is a super-resolution medium, change a current linear velocity to a linear velocity at which information can be reproduced at a channel bit rate of n (n: an integer) times of a channel bit rate of a medium information region of the optical information recording medium.

2. A reproducing device capable of reproducing content by irradiating, via an objective lens having a numerical aperture of 0.85, an optical information recording medium with reproduction light having a wavelength of 405 nm, the optical information recording medium including (a) a light transmitting layer having a surface which the reproduction light enters, (b) an information recording layer which the reproduction light reflects off so that information is reproduced, and (c) a substrate on which a pit group is provided in a scanning direction, the pit group including one or more pits shorter than 119 nm which is an optical system resolution limit of the reproducing device, the light transmitting layer, the information recording layer, and the substrate being provided in this order from a side from which the reproduction light enters, the content being recorded in the information recording layer by use of the pit group, comprising:

an irradiation section for irradiating the optical information recording medium with reproduction light;

a conversion section for converting, into reproduction signal indicative of the content, light which reflected off the optical information recording medium;

a signal quality evaluating section for evaluating quality of the reproduction signal converted by the conversion section; and a spherical aberration correcting section for correcting a spherical aberration caused by the irradiation section, by using a result of evaluation of the quality of the reproduction signal which quality has been evaluated by the signal quality evaluating section; wherein the signal quality evaluating section is an i-MLSE (Integrated-Maximum Likelihood Sequence Estimation) detecting section for (a) detecting an i-MLSE which is an evaluation index for evaluating a signal characteristic of the reproduction signal and (b) evaluating quality of the reproduction signal, the reproducing device being configured to (i) determine whether the optical information recording medium is a super-resolution medium or a conventional medium and (ii) in a case where the reproducing device has determined that the optical information recording medium is a super-resolution medium, change a current linear velocity to a linear velocity at which information can be reproduced at a channel bit rate of n (n: an integer) times of a channel bit rate of a medium information region of the optical information recording medium.

* * * * *